(12) United States Patent
Zhang et al.

(10) Patent No.: US 11,804,944 B2
(45) Date of Patent: Oct. 31, 2023

(54) BEAM SWEEPING PATTERN SWITCHING

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 17/454,426

(22) Filed: Nov. 10, 2021

(65) Prior Publication Data

US 2023/0147277 A1 May 11, 2023

(51) Int. Cl.
| | | |
|---|---|---|
| *H04L 5/14* | (2006.01) | |
| *H04B 7/06* | (2006.01) | |
| *H04W 72/04* | (2023.01) | |
| *H04L 1/08* | (2006.01) | |

(52) U.S. Cl.
CPC .............. *H04L 5/14* (2013.01); *H04B 7/0617* (2013.01); *H04L 1/08* (2013.01); *H04W 72/04* (2013.01)

(58) Field of Classification Search
CPC ... H04L 5/0048; H04L 5/0023; H04L 5/0051; H04L 5/14; H04L 1/08; H04B 7/0617; H04B 17/318; H04B 7/043; H04B 7/0695; H04B 7/088; H04W 72/046; H04W 72/04
See application file for complete search history.

(56) References Cited

U.S. PATENT DOCUMENTS

| | | | |
|---|---|---|---|
| 2018/0048442 A1* | 2/2018 | Sang | H04W 72/046 |
| 2019/0379441 A1* | 12/2019 | Priyanto | H04L 5/0048 |
| 2022/0247474 A1* | 8/2022 | Rune | H04B 7/024 |
| 2023/0083914 A1* | 3/2023 | Nammi | H04L 1/1822 |

* cited by examiner

*Primary Examiner* — Rushil P. Sampat
(74) *Attorney, Agent, or Firm* — QUALCOMM Incorporated

(57) ABSTRACT

Techniques and apparatus for beam sweeping pattern switching. A method that may be performed by a user equipment (UE) includes receiving signaling configuring the UE with a first set of repetition and beam sweeping patterns for half-duplex communications and a second set of repetition and beam sweeping patterns for full-duplex communications; and participating in half-duplex communications and full-duplex communications using the first and second sets of repetition and beam sweeping patterns.

26 Claims, 15 Drawing Sheets

BEAM SWEEPING PATTERN SWITCHING

BACKGROUND

Field of the Disclosure

Aspects of the present disclosure relate to wireless communications, and more particularly, to techniques and apparatus for communicating with a beam sweeping pattern.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include desirable communication performance, for example, due to the various triggers to switch a beam sweeping pattern.

Certain aspects of the subject matter described in this disclosure can be implemented in a method for wireless communication by a user equipment (UE). The method generally includes receiving signaling configuring the UE with a first set of repetition and beam sweeping patterns for half-duplex communications and a second set of repetition and beam sweeping patterns for full-duplex communications; and participating in half-duplex communications and full-duplex communications using the first and second sets of repetition and beam sweeping patterns.

Certain aspects of the subject matter described in this disclosure can be implemented in a method for wireless communication by a network entity. The method generally includes transmitting signaling configuring a UE with a first set of repetition and beam sweeping patterns for half-duplex communications and a second set of repetition and beam sweeping patterns for full-duplex communications; and participating in half-duplex communications and full-duplex communications using the first and second sets of repetition and beam sweeping patterns.

Certain aspects of the subject matter described in this disclosure can be implemented in an apparatus for wireless communication. The apparatus generally includes a memory and a processor coupled to the memory. The processor and the memory are configured to receive signaling configuring the UE with a first set of repetition and beam sweeping patterns for half-duplex communications and a second set of repetition and beam sweeping patterns for full-duplex communications; and participate in half-duplex communications and full-duplex communications using the first and second sets of repetition and beam sweeping patterns.

Certain aspects of the subject matter described in this disclosure can be implemented in an apparatus for wireless communication. The apparatus generally includes a memory and a processor coupled to the memory. The processor and the memory are configured to transmit signaling configuring a UE with a first set of repetition and beam sweeping patterns for half-duplex communications and a second set of repetition and beam sweeping patterns for full-duplex communications; and participate in half-duplex communications and full-duplex communications using the first and second sets of repetition and beam sweeping patterns.

Certain aspects of the subject matter described in this disclosure can be implemented in an apparatus for wireless communication. The apparatus generally includes means for receiving signaling configuring the UE with a first set of repetition and beam sweeping patterns for half-duplex communications and a second set of repetition and beam sweeping patterns for full-duplex communications; and means for participating in half-duplex communications and full-duplex communications using the first and second sets of repetition and beam sweeping patterns.

Certain aspects of the subject matter described in this disclosure can be implemented in an apparatus for wireless communication. The apparatus generally includes means for transmitting signaling configuring a UE with a first set of repetition and beam sweeping patterns for half-duplex communications and a second set of repetition and beam sweeping patterns for full-duplex communications; and means for participating in half-duplex communications and full-duplex communications using the first and second sets of repetition and beam sweeping patterns.

Certain aspects of the subject matter described in this disclosure can be implemented in a computer-readable medium. The computer-readable medium has instructions stored thereon for receiving signaling configuring the UE with a first set of repetition and beam sweeping patterns for half-duplex communications and a second set of repetition and beam sweeping patterns for full-duplex communications; and participating in half-duplex communications and full-duplex communications using the first and second sets of repetition and beam sweeping patterns.

Certain aspects of the subject matter described in this disclosure can be implemented in a computer-readable medium. The computer-readable medium has instructions stored thereon for transmitting signaling configuring a UE with a first set of repetition and beam sweeping patterns for half-duplex communications and a second set of repetition and beam sweeping patterns for full-duplex communications; and participating in half-duplex communications and full-duplex communications using the first and second sets of repetition and beam sweeping patterns.

Certain aspects of the subject matter described in this disclosure can be implemented in a method for wireless communication by a UE. The method generally includes receiving signaling configuring the UE with a first set of repetition and beam sweeping patterns for a first logical channel and a second set of repetition and beam sweeping patterns for a second logical channel; and communicating with a network entity with the first and second logical channels using the first and second sets of repetition and beam sweeping patterns.

Certain aspects of the subject matter described in this disclosure can be implemented in a method for wireless communication by a network entity. The method generally includes transmitting signaling configuring a UE with a first set of repetition and beam sweeping patterns for a first logical channel and a second set of repetition and beam sweeping patterns for a second logical channel; and communicating with the UE with the first and second logical channels using the first and second sets of repetition and beam sweeping patterns.

Certain aspects of the subject matter described in this disclosure can be implemented in an apparatus for wireless communication. The apparatus generally includes a memory and a processor coupled to the memory. The processor and the memory are configured to receive signaling configuring the UE with a first set of repetition and beam sweeping patterns for a first logical channel and a second set of repetition and beam sweeping patterns for a second logical channel; and communicate with a network entity with the first and second logical channels using the first and second sets of repetition and beam sweeping patterns.

Certain aspects of the subject matter described in this disclosure can be implemented in an apparatus for wireless communication. The apparatus generally includes a memory and a processor coupled to the memory. The processor and the memory are configured to transmit signaling configuring a UE with a first set of repetition and beam sweeping patterns for a first logical channel and a second set of repetition and beam sweeping patterns for a second logical channel; and communicate with the UE with the first and second logical channels using the first and second sets of repetition and beam sweeping patterns.

Certain aspects of the subject matter described in this disclosure can be implemented in an apparatus for wireless communication. The apparatus generally includes means for receiving signaling configuring the UE with a first set of repetition and beam sweeping patterns for a first logical channel and a second set of repetition and beam sweeping patterns for a second logical channel; and means for communicating with a network entity with the first and second logical channels using the first and second sets of repetition and beam sweeping patterns.

Certain aspects of the subject matter described in this disclosure can be implemented in an apparatus for wireless communication. The apparatus generally includes means for transmitting signaling configuring a UE with a first set of repetition and beam sweeping patterns for a first logical channel and a second set of repetition and beam sweeping patterns for a second logical channel; and means for communicating with the UE with the first and second logical channels using the first and second sets of repetition and beam sweeping patterns.

Certain aspects of the subject matter described in this disclosure can be implemented in a computer-readable medium. The computer-readable medium has instructions stored thereon for receiving signaling configuring the UE with a first set of repetition and beam sweeping patterns for a first logical channel and a second set of repetition and beam sweeping patterns for a second logical channel; and communicating with a network entity with the first and second logical channels using the first and second sets of repetition and beam sweeping patterns.

Certain aspects of the subject matter described in this disclosure can be implemented in a computer-readable medium. The computer-readable medium has instructions stored thereon for transmitting signaling configuring a UE with a first set of repetition and beam sweeping patterns for a first logical channel and a second set of repetition and beam sweeping patterns for a second logical channel; and communicating with the UE with the first and second logical channels using the first and second sets of repetition and beam sweeping patterns.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
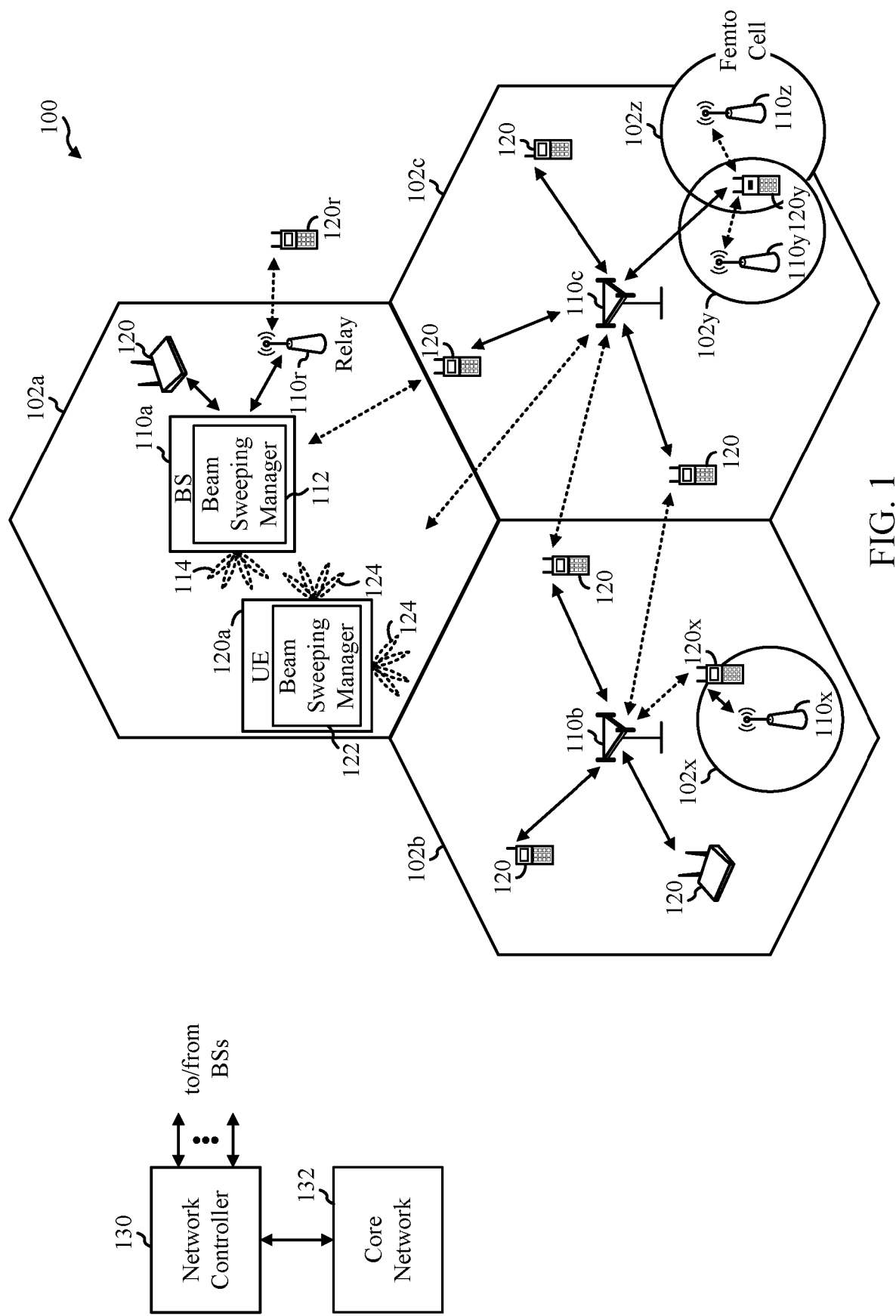
FIG. 1 is a block diagram conceptually illustrating an example wireless communication network, in accordance with certain aspects of the present disclosure.

Aspects of the present disclosure provide apparatus, methods, processing systems, and computer readable mediums for beam sweeping pattern switching.

Full-duplex communications may introduce interference at certain wireless communication devices, and the interference may degrade the performance of wireless communications. A UE may encounter self-interference from full-duplex communications, where an uplink transmission may interfere with a downlink transmission at the UE. Full-duplex communications may also generate interference from clutter echo. The interference may cause a decoding failure at a wireless communication device, and the wireless communication device may request a retransmission, which will increase the latency and decrease the throughput of wireless communications.

Aspects of the present disclosure provide techniques and apparatus for switching between beam sweeping patterns, for example, for full-duplex and/or half-duplex communications. The UE may use a different beam sweeping pattern for certain transmission occasions, for example, depending on whether the transmission occasions are full-duplex (with overlapping SPS and CG occasions) or half-duplex. Separate beam sweeping patterns may enable beam separation between the overlapping SPS and CG occasions, and the beam separation may enable reduced interference between uplink and downlink transmissions for full-duplex communications. For example, an SPS occasion, which overlaps with a CG occasion, may be configured with a certain number of repetitions and certain beam sweeping pattern (e.g., a sequence of certain downlink beams), whereas the overlapping CG occasion may be configured with a different number of repetitions and/or different beam sweeping pattern (e.g., a different sequence of uplink beams). In certain aspects, the beam sweeping patterns may be associated with separate logical channels, for example, specific types of communication services (such as URLLC and/or eMBB) or quality of service flows. A particular beam sweeping pattern may be triggered for a specific logical channel. For example, a UE may use a first beam sweeping pattern for a first logical channel (e.g., URLLC) and a second beam sweeping pattern for a second logical channel (e.g., eMBB).

The techniques and apparatus for triggering beam sweeping patterns may enable desirable performance (e.g., desirable data rates, latency, and/or spectral efficiencies) for full-duplex and/or half-duplex communications, for example, due to spatial diversity and/or a reduction in interference from full-duplex communication facilitated by certain beam sweeping patterns. The techniques and apparatus for triggering beam sweeping patterns may enable desirable performance for various logical channels (such as certain types of services), for example, due to the spatial diversity facilitated by certain beam sweeping patterns.

The following description provides examples of beam sweeping in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110*a-z* (each also individually referred to herein as BS 110 or collectively as BSs 110) and/or user equipment (UE) 120*a-y* (each also individually referred to herein as UE 120 or collectively as UEs 120) in the wireless communication network 100 via one or more interfaces.

As shown in FIG. 1, the BS 110*a* includes a beam sweeping manager 112 that configures a UE with beam sweeping patterns for half-duplex communications, full-duplex communications, and/or logical channels, in accordance with aspects of the present disclosure. The UE 120*a* includes a beam sweeping manager 122 that communicates with a BS using beam sweeping patterns for half-duplex communications, full-duplex communications, and/or logical channels, in accordance with aspects of the present disclosure. As an example, the UE 120*a* may sweep through one or more of the beams 124 to communicate with the BS 110*a* and/or BS 110*b*, and the BS 110*a* may sweep through one or more beams 114 to communicate with the UE 120*a*, as further described herein.

The term "beam" may be used in the present disclosure in various contexts. Beam may be used to mean a set of gains and/or phases (e.g., pre-coding weights or co-phasing weights) applied to antenna elements in the UE and/or BS for transmission or reception. The term "beam" may also refer to an antenna or radiation pattern of a signal transmitted while applying the gains and/or phases to the antenna elements. Other references to beam may include one or more properties or parameters associated with the antenna (radiation) pattern, such as angle of arrival (AoA), angle of departure (AoD), gain, phase, directivity, beam width, beam direction (with respect to a plane of reference) in terms of azimuth and elevation, peak-to-side-lobe ratio, or an antenna port associated with the antenna (radiation) pattern. The term "beam" may also refer to an associated number and/or configuration of antenna elements (e.g., a uniform linear array, a uniform rectangular array, or other uniform array).

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. ABS may support one or multiple cells.

The BSs 110 communicate with UEs 120 in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
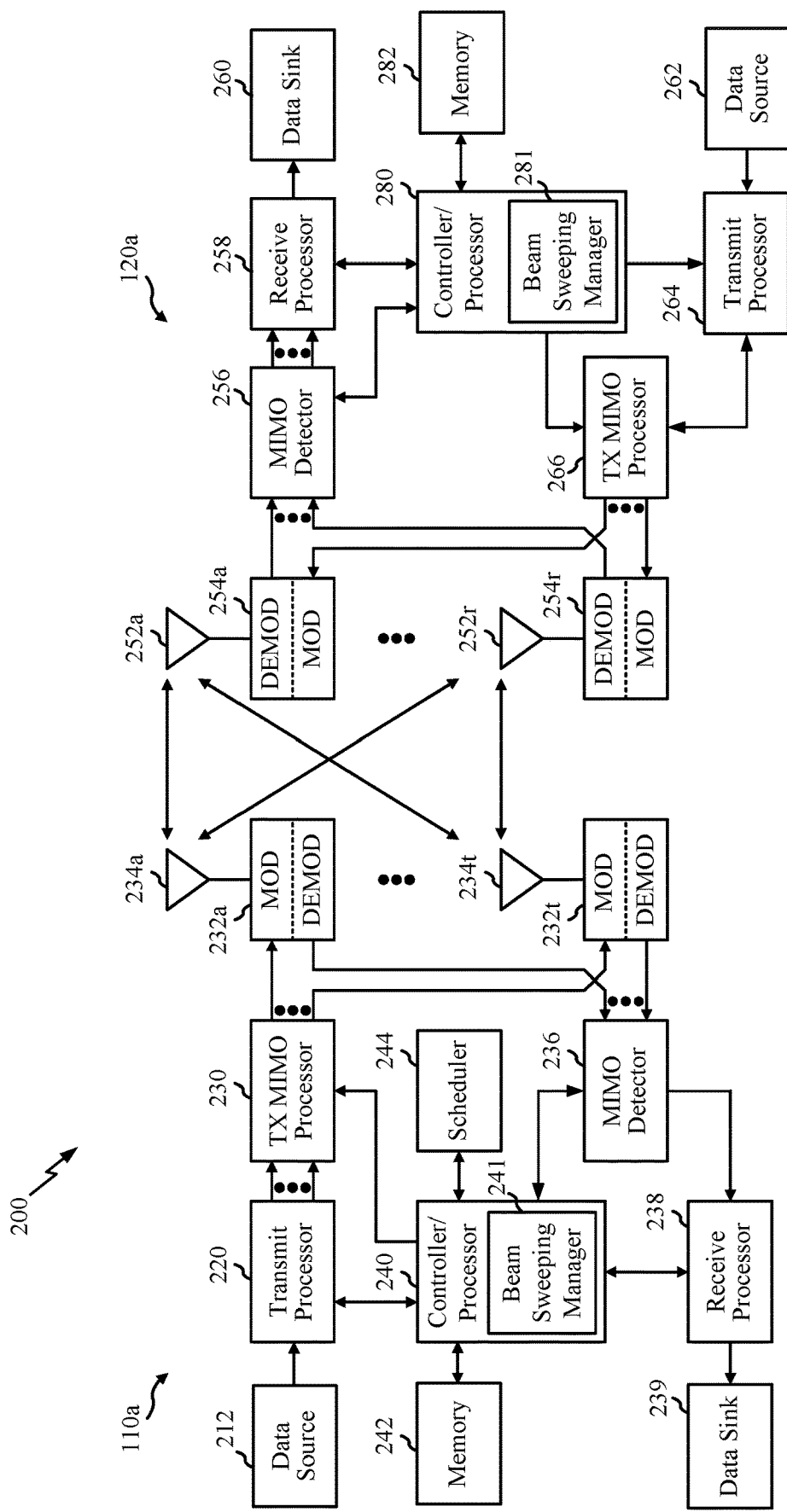
FIG. 2 is a block diagram conceptually illustrating a design of an example base station (BS) and user equipment (UE), in accordance with certain aspects of the present disclosure.

FIG. 2 illustrates example components of BS 110*a* and UE 120*a* (e.g., the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a beam sweeping manager 241 that may be representative of the beam sweeping manager 112, according to aspects described herein. As shown in FIG. 2, the controller/processor 280 of the UE 120a has a beam sweeping manager 281 that may be representative of the beam sweeping manager 122, according to aspects described herein. Although shown at the controller/processor, other components of the UE 120a and BS 110a may be used to perform the operations described herein.

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some embodiments, the BS 110a illustrated in FIG. 2 and described above is an example of another UE 120.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kHz and other SCS may be defined with respect to the base SCS (e.g., 30 kHz, 60 kHz, 120 kHz, 240 kHz, etc.).

Figure 3:
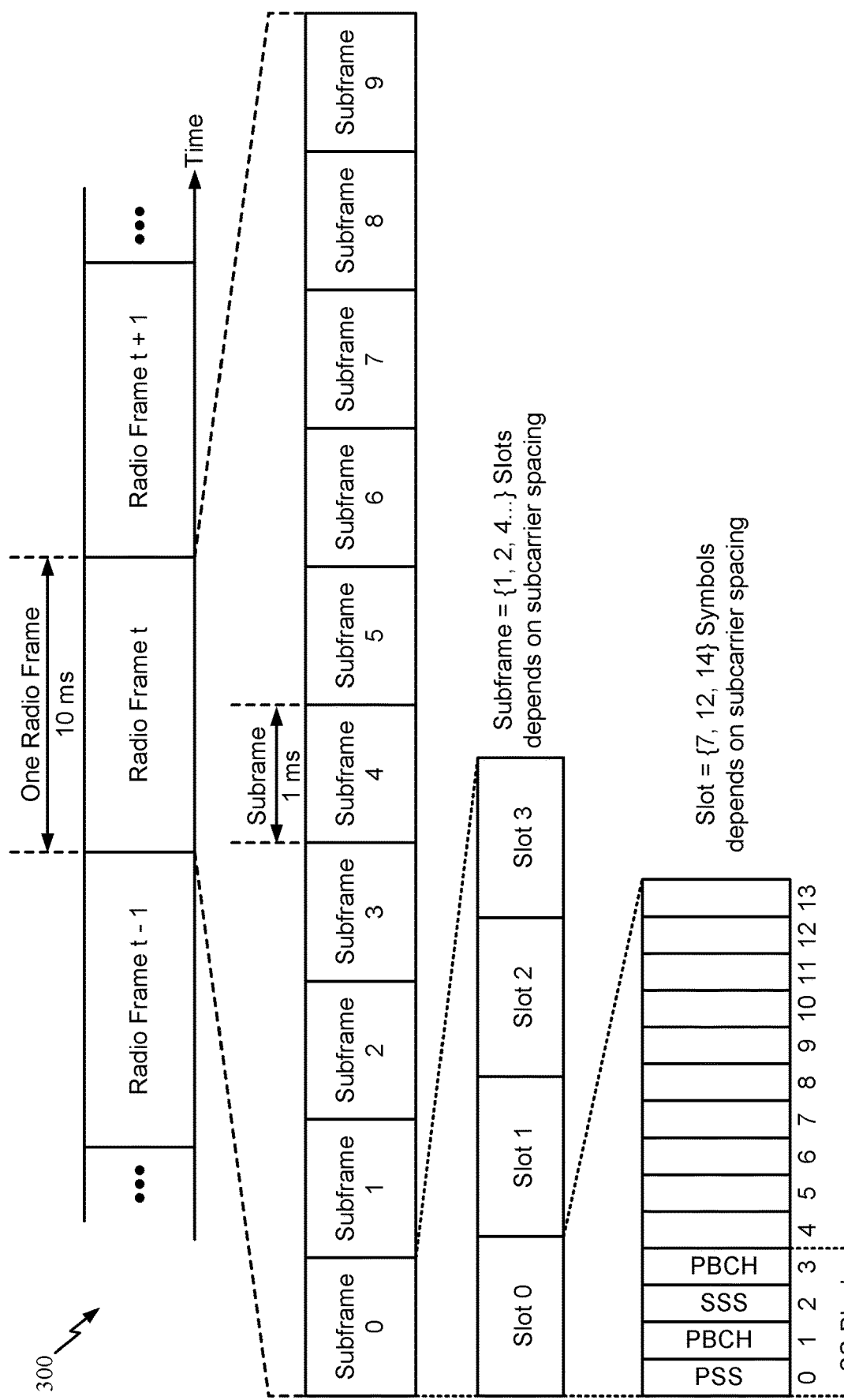
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst periodicity, system frame number, etc. The SSBs may be organized into an SS burst to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times within an SS burst, for example, with up to sixty-four different beam directions for mmWave. The multiple transmissions of the SSB are referred to as an SS burst in a half radio frame. SSBs in an SS burst may be transmitted in the same frequency region, while SSBs in different SS bursts can be transmitted at different frequency regions.

In certain cases, a wireless communication system (e.g., a 5G NR system) may provide periodic transmission occasions for downlink and/or uplink data transmissions. Such transmission occasions may enable a UE to communicate with a radio access network without receiving dynamic scheduling for each separate transmission occasion. Such a scheduling mechanism may reduce the latency for wireless communications and provide spectral efficiencies, for example, due to bypassing the control signaling for scheduling requests and/or scheduling grants. For example, a semi-persistent scheduling (SPS) configuration may provide periodic transmission occasions for downlink data transmissions, and a configuration grant (CG) configuration may provide periodic transmission occasions for uplink data transmissions. A UE may support multiple active SPS and/or CG configurations. The UE may receive the configurations for SPS and/or CG occasions from the network and communicate with the network in the SPS and/or CG occasions, which can bypass downlink control signaling for each separate transmission occasion (SPS and/or CG). In general, a transmission occasion for a SPS configuration may be referred to as an SPS occasion, and a transmission occasion for a CG configuration may be referred to as an CG occasion.

Figure 4A:
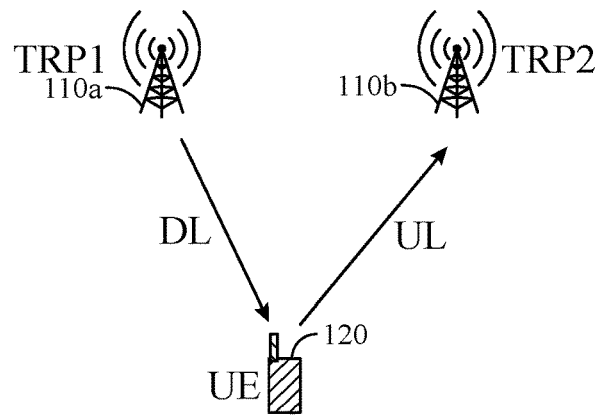
FIGS. 4A-4C are diagrams of example full-duplex communications.
Figure 4B:
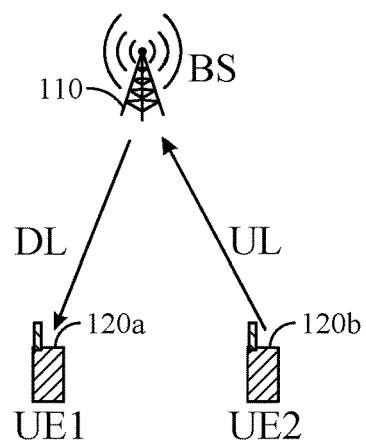
Figure 4C:
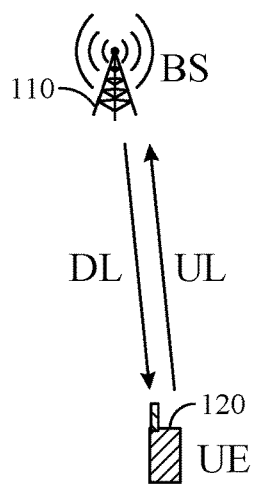

In certain cases, a wireless communication system (e.g., a 5G NR system) may support full-duplex communications, where wireless communication devices may communicate with each other simultaneously (e.g., via concurrent uplink and downlink transmissions). Full-duplex communications may facilitate desirable latency at a UE, spectral efficiencies, and/or efficient resource utilization. Full-duplex communications may use beam separation (e.g., separate beams for uplink and downlink transmissions). Full-duplex communications may be employed for FR1 and/or FR2 bands, integrated access and backhaul (IAB), and/or an access link. Full-duplex may be supported at the BS and/or UE. For example, FIG. 4A is a diagram illustrating an example of full-duplex communications at the UE 120, where the UE 120 may simultaneously receive downlink signaling from a first BS 110a and transmits uplink signaling to a second BS 110b. In certain cases, the first and BSs 110a, 110b may represent transmission reception points (TRPs) in communication with a BS (not shown). FIG. 4B is a diagram illustrating an example of full-duplex communications at the BS 110, where the BS 110 may simultaneously transmit downlink signaling to a first UE 120a and receive uplink signaling from a second UE 120b. FIG. 4C is a diagram illustrating an example of full-duplex communications at the BS 110 and UE 120, where the BS 110 and UE 120 communicate with each other simultaneously.

Full-duplex communications may introduce interference at certain wireless communication devices, and the interference may degrade the performance of wireless communications. A UE may encounter self-interference from full-duplex communications, where an uplink transmission may interfere with a downlink transmission at the UE. Full-duplex communications may also generate interference from clutter echo. The interference may cause a decoding failure at a wireless communication device, and the wireless communication device may request a retransmission, which will increase the latency and decrease the throughput of wireless communications.

Figure 5:
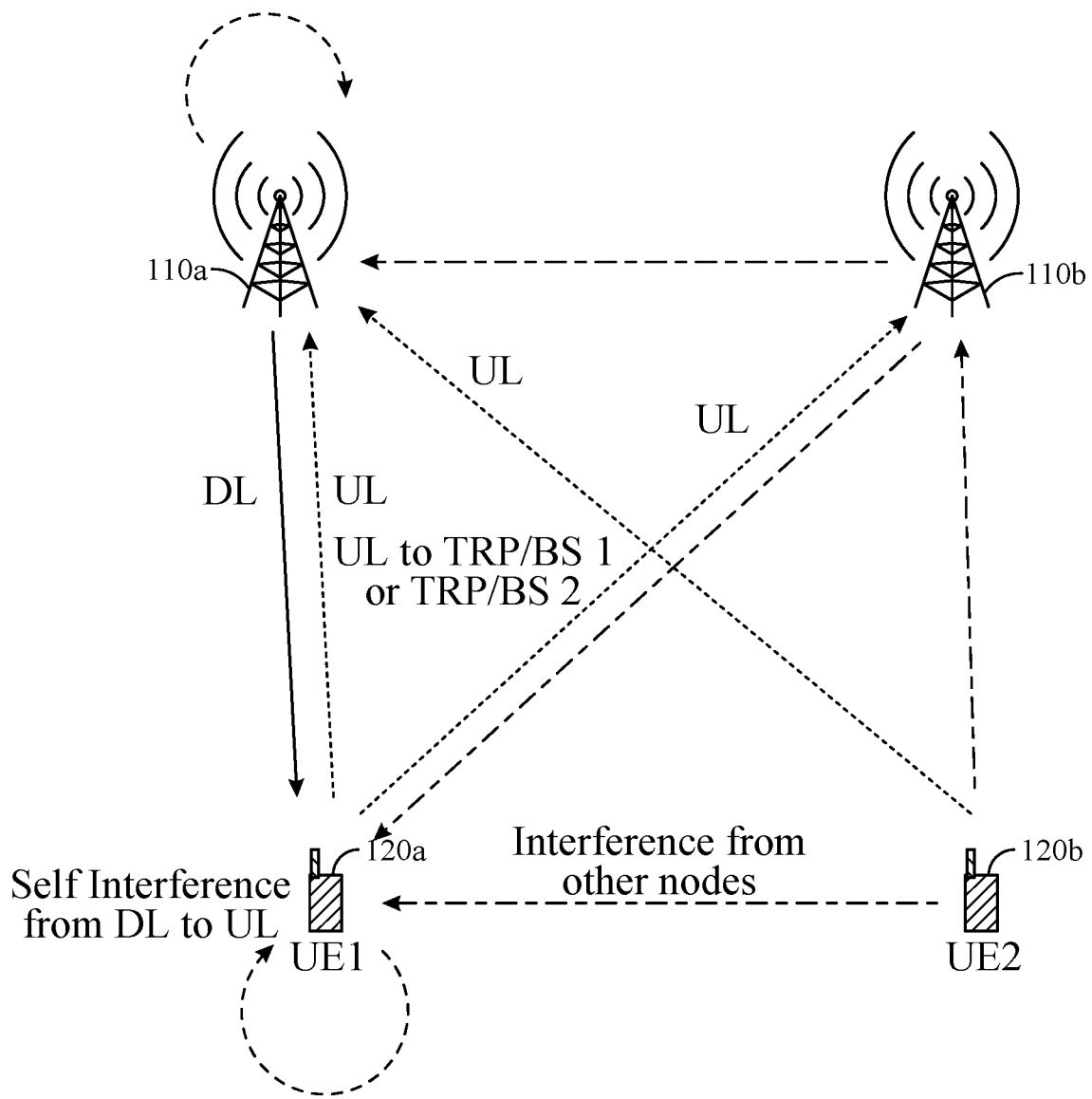
FIG. 5 is a diagram illustrating various half-duplex and full-duplex scenarios where interference may be encountered at a BS and/or UE.

FIG. 5 is a diagram illustrating various half-duplex and full-duplex scenarios where interference may be encountered at a BS and/or UE. As shown, a first UE 120a may communicate with a first BS 110a in full-duplex mode, such that the first UE 120a and/or the first BS 110a may encounter self-interference due to the full-duplex transmissions. In certain cases, the first UE 120a and/or the first BS 110a may encounter interference from other wireless nodes, such as a second UE 120b and/or a second BS 110b. In certain cases, the first UE 120a may simultaneously may receive downlink signaling from the first BS 110a and transmit uplink signaling to the second BS 110b. In such cases, the second BS 110b may encounter interference from other wireless nodes, such as the second UE 120b.

Accordingly, what is needed are techniques and apparatus for mitigating interference in full-duplex communications.

Example Beam Sweeping Pattern Switch

Aspects of the present disclosure provide techniques and apparatus for switching between beam sweeping patterns, for example, for full-duplex and/or half-duplex communications.

As an example, a UE may be configured with one or more beam sweeping patterns associated with a SPS configuration and/or a CG configuration. The UE may use a different beam sweeping pattern for certain transmission occasions, for example, depending on whether the transmission occasions are full-duplex (with overlapping SPS and CG occasions) or half-duplex. Separate beam sweeping patterns may enable beam separation between the overlapping SPS and CG occasions, and the beam separation may enable reduced interference between uplink and downlink transmissions for full-duplex communications.

For example, an SPS occasion, which overlaps with a CG occasion, may be configured with a certain number of repetitions and certain beam sweeping pattern (e.g., a sequence of certain downlink beams), whereas the overlapping CG occasion may be configured with a different number of repetitions and/or different beam sweeping pattern (e.g., a different sequence of uplink beams).

In certain aspects, the beam sweeping patterns may be associated with separate logical channels, for example, specific types of communication services (such as URLLC and/or eMBB) or quality of service flows. A particular beam sweeping pattern may be triggered for a specific logical channel. For example, a UE may use a first beam sweeping pattern for a first logical channel (e.g., URLLC) and a second beam sweeping pattern for a second logical channel (e.g., eMBB).

The techniques and apparatus for triggering beam sweeping patterns may enable desirable performance (e.g., desirable data rates, latency, and/or spectral efficiencies) for full-duplex and/or half-duplex communications, for example, due to spatial diversity and/or a reduction in interference from full-duplex communication facilitated by certain beam sweeping patterns. The techniques and apparatus for triggering beam sweeping patterns may enable desirable performance for various logical channels (such as certain types of services), for example, due to the spatial diversity facilitated by certain beam sweeping patterns.

Figure 6:
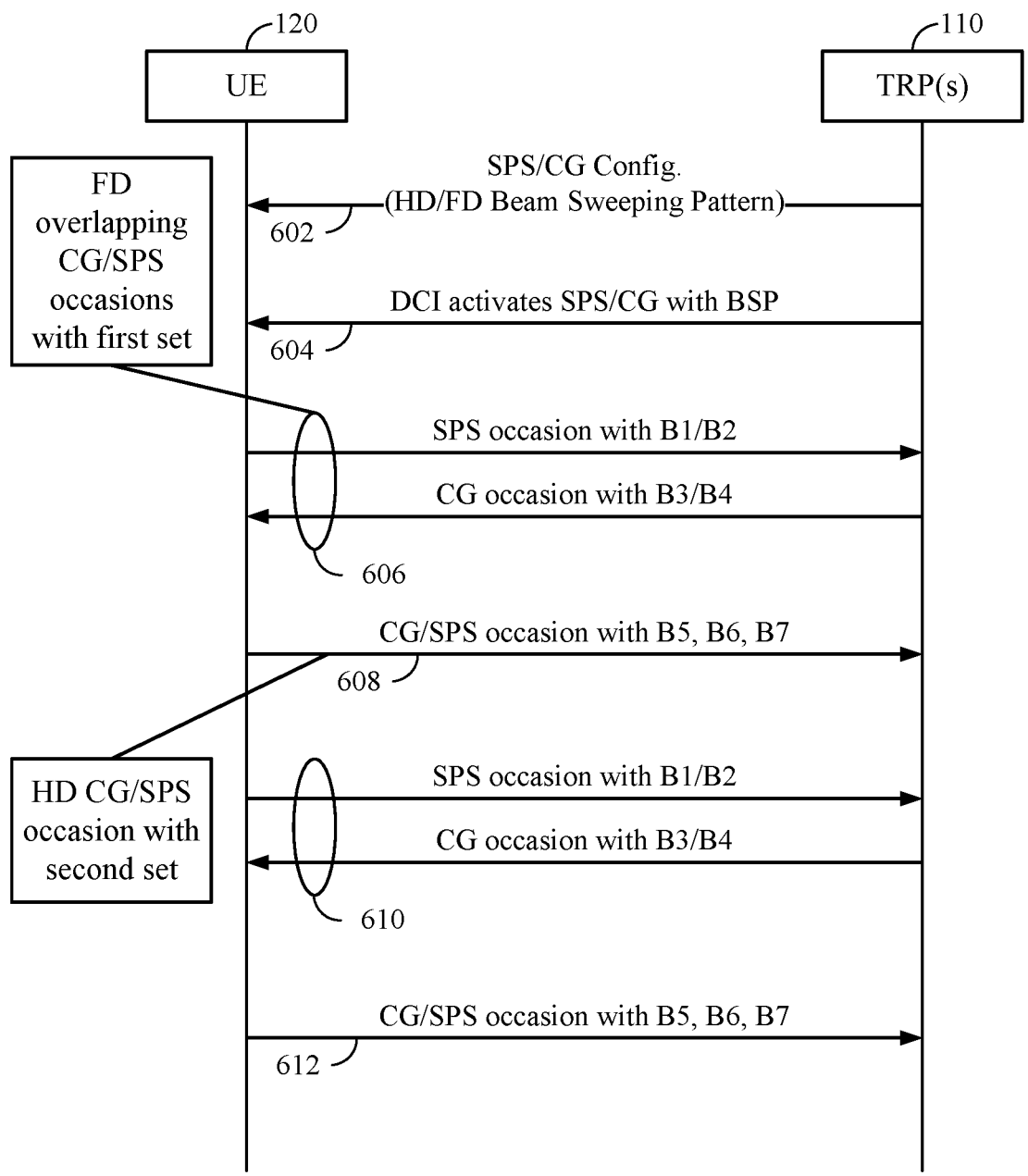
FIG. 6 is a signaling flow diagram illustrating examples of switching between beam sweeping patterns for full-duplex and/or half-duplex communications, in accordance with certain aspects of the present disclosure.

FIG. 6 is a signaling flow diagram illustrating examples of switching between beam sweeping patterns for full-duplex and/or half-duplex communications, in accordance with certain aspects of the present disclosure.

At 602, the UE 120 may receive, from a BS 110, SPS and CG configurations providing beam sweeping patterns triggered based on full-duplex and/or half-duplex communications for the SPS/CG occasions.

In certain aspects, the SPS and CG configurations may be provided via radio resource control (RRC) signaling, such as the information elements SPS-Config and ConfiguredGrantConfig. For example, the UE 120 may receive a first set of repetition and beam sweeping patterns for full-duplex communications (e.g., when an SPS occasion overlaps with an CG occasion) and a second set of repetition and beam sweeping patterns for half-duplex communications (e.g., when an SPS occasion is non-overlapping with an CG occasion, or vice versa). For certain aspects, a set of repetition and beam sweeping patterns may include a number of repetitions for a data block and a sequence of one or more beams for beam sweeping per one or more transmission occasion (e.g., an SPS occasion or CG occasion). As an example, a set of repetition and beam sweeping patterns may have two repetitions for a data block using two beams in the beam sweeping sequence per a transmission occasion. In an SPS occasion, the UE may monitor for two instances of the data block using a first beam and then a second beam, for example. In certain cases, the BS 110 may represent multiple transmission reception points (TRPs) in communication with a base station, for example, as depicted in FIG. 4A.

Optionally, at 604, the UE 120 may receive, from the BS 110, downlink control information (DCI) that activates an SPS configuration and/or an CG configuration with certain beam sweeping patterns. In certain cases, the CG configuration may have some CG occasions that overlap with some of the SPS occasions of the SPS configuration. In aspects, the DCI at 604 may include one or more DCI messages.

At 606, the UE 120 may participate in full-duplex (FD) communications (such as depicted in FIG. 4A or 4C) with the BS 110 using the first set of repetition and beam sweeping patterns.

For example, the first set of repetition and beam sweeping patterns may provide two repetitions with a sequence of two different beams. In an SPS occasion at 606, the UE 120 may monitor for two instances of a downlink data block (such as a packet, transport block, code block, etc.) via a first beam (B1) and a second beam (B2) from the BS 110, where each instance of the data block uses a separate beam in the sequence of beams of the beam sweeping pattern. In an overlapping CG occasion (e.g., the SPS occasion overlaps with the CG occasion) at 606, the UE 120 may transmit, to the BS 110, two instances of an uplink data block via a third beam (B3) and a fourth beam (B4). In aspects, an instance of a data block may represent one or more repetitions or re-transmissions of the data block. In certain aspects, the spatial diversity provided by the different beams for uplink and downlink transmissions in the overlapping SPS and CG occasions may facilitate a reduction in self-interference at the UE 120 for the full-duplex communications.

At 608, the UE 120 may participate in half-duplex (HD) communications with the BS 110 using the second set of repetition and beam sweeping patterns. With the transition from full-duplex communications to half-duplex communications, the UE 120 may use a different beam sweeping pattern (e.g., a different number of repetitions and/or sequence of beams) for the half-duplex communications.

As an example, the second set of repetition and beam sweeping patterns may indicate three repetitions of a data block with a sequence of three different beams. In a non-overlapping CG occasion (e.g., a CG occasion that does not overlap with another SPS occasion at the UE 120) at 608, the UE 120 may transmit, to the BS 110, three instances of an uplink data block via a fifth beam (B5), a sixth beam (B6), and a seventh beam (B7). In certain cases, due to there being no self-interference for half-duplex communications, the second set of repetition and beam sweeping patterns may provide a single beam without any repetitions in the data block (e.g., a single instance of the data block for transmission).

At 610, the UE 120 may again participate in full-duplex communications using the first set of repetition and beam sweeping patterns, for example, as described herein with respect to 606. At 612, the UE 120 may also again participate in half-duplex communications with the second set of repetition and beam sweeping patterns, for example, as described herein with respect to 608.

Figure 7:
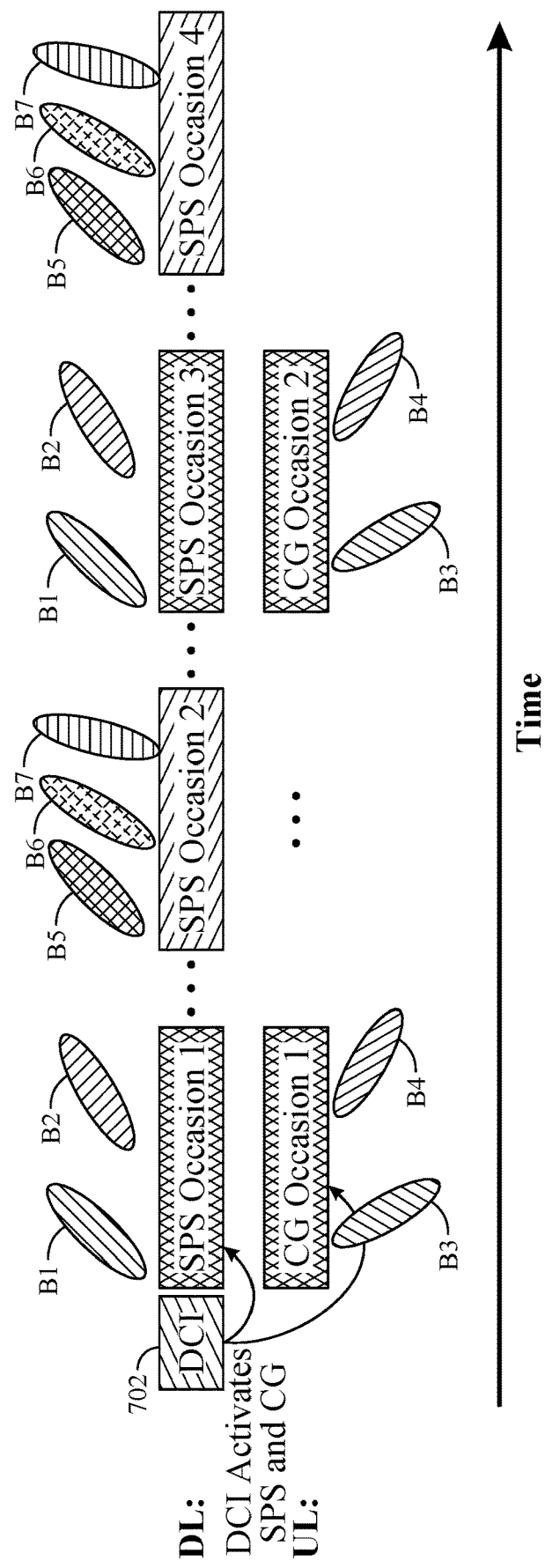
FIG. 7 is a timing diagram illustrating examples of beam sweeping patterns configured for full-duplex and/or half-duplex communications as described herein with respect to FIG. 6, in accordance with certain aspects of the present disclosure.

FIG. 7 is a timing diagram illustrating examples of beam sweeping patterns configured for full-duplex and/or half-duplex communications as described herein with respect to FIG. 6, in accordance with certain aspects of the present disclosure. In this example, the UE may receive the DCI 702 that activates an SPS configuration and/or CG configuration, for example, at 604 depicted in FIG. 6. As SPS occasion 1 and CG occasion 1 overlap with each other, the UE may use the first set of repetition and beam sweeping patterns as described herein with respect to FIG. 6. For example, in the SPS occasion 1, the UE may monitor for a first instance of a downlink data block via the first beam (B1) and a second instance of the downlink data block (e.g., a repetition or retransmission of the data block) via the second beam (B2) from the BS 110. The instances of the data block may be transmitted in the same or separate time domain resources. In the CG occasion 1, the UE may transmit, to the BS, a first instance of an uplink data block via the third beam (B3) and a second instance of the uplink data block (e.g., a repetition or retransmission of the data block) via the fourth beam (B4). In certain aspects, an SPS occasion may be considered to be overlapping with an CG occasion (or vice versa) when the SPS occasion at least partially overlaps with the CG occasion in time.

In SPS occasion 2, the UE may participate in half-duplex communications using the second set of repetition and beam sweeping patterns. For example, the UE may monitor for a first instance of the data block via the fifth beam (B5), a second instance of the data block via the sixth beam (B6), and a third instance of the data block via the seventh beam (B7) from the BS.

As SPS occasion 3 and CG occasion 2 overlap with each other in time, the UE may use the first set of repetition and beam sweeping patterns for full-duplex communications as described herein. In the non-overlapping SPS occasion 4, the UE may participate in half-duplex communications using the second set of repetition and beam sweeping patterns.

In certain aspects, repetition and beam sweeping patterns for an SPS and/or CG occasion may not have repetitions for monitoring or transmitting the data block. For example, for half-duplex communications, the UE may be configured to transmit or monitor for a single instance of a data block using a single beam. In certain aspects, for overlapping SPS/CG occasions, the UE may be configured with separate repetition and beam sweeping patterns for the CG occasion and SPS occasion. Referring to FIG. 7, in SPS occasion 1, the UE may monitor for three instances of the downlink data block using three separate beams, and in CG occasion 1, the UE may transmit two instances of the uplink data block using two separate beams.

In certain aspects, a particular logical channel may be used to trigger a specific beam sweeping pattern. A logical channel may include at least one of a type of communication service (e.g., URRLC, eMBB, etc.), a data radio bearer, a quality of service (QoS) flow (e.g., a set of QoS attributes or characteristics for a particular service, such as conversational voice traffic, real time gaming traffic, discrete automation traffic, electricity distribution traffic, voice/video live streaming traffic) or an identifier thereof (e.g., a 5G QoS identifier), or a network slice. For example, a beam sweeping pattern may be associated with a particular type of communication service, data radio bearer, quality of service flow, or a network slice. In response to using the particular type of communication service (and/or data radio bearer, quality of service flow, or network slice), the UE may use the beam sweeping pattern to communicate with a network entity, such as a base station. The beam sweeping pattern may be configured to match the service quality of the logical channel as further described herein. As examples, for mission critical services (such as discrete automation or URLLC), the beam sweeping pattern may have multiple repetitions with separate beams. For a service without a guaranteed bit rate (e.g., certain eMBB services), the beam sweeping pattern may have a single beam without repetitions (e.g., transmission of a single instance of the data block via a single beam).

Figure 8:
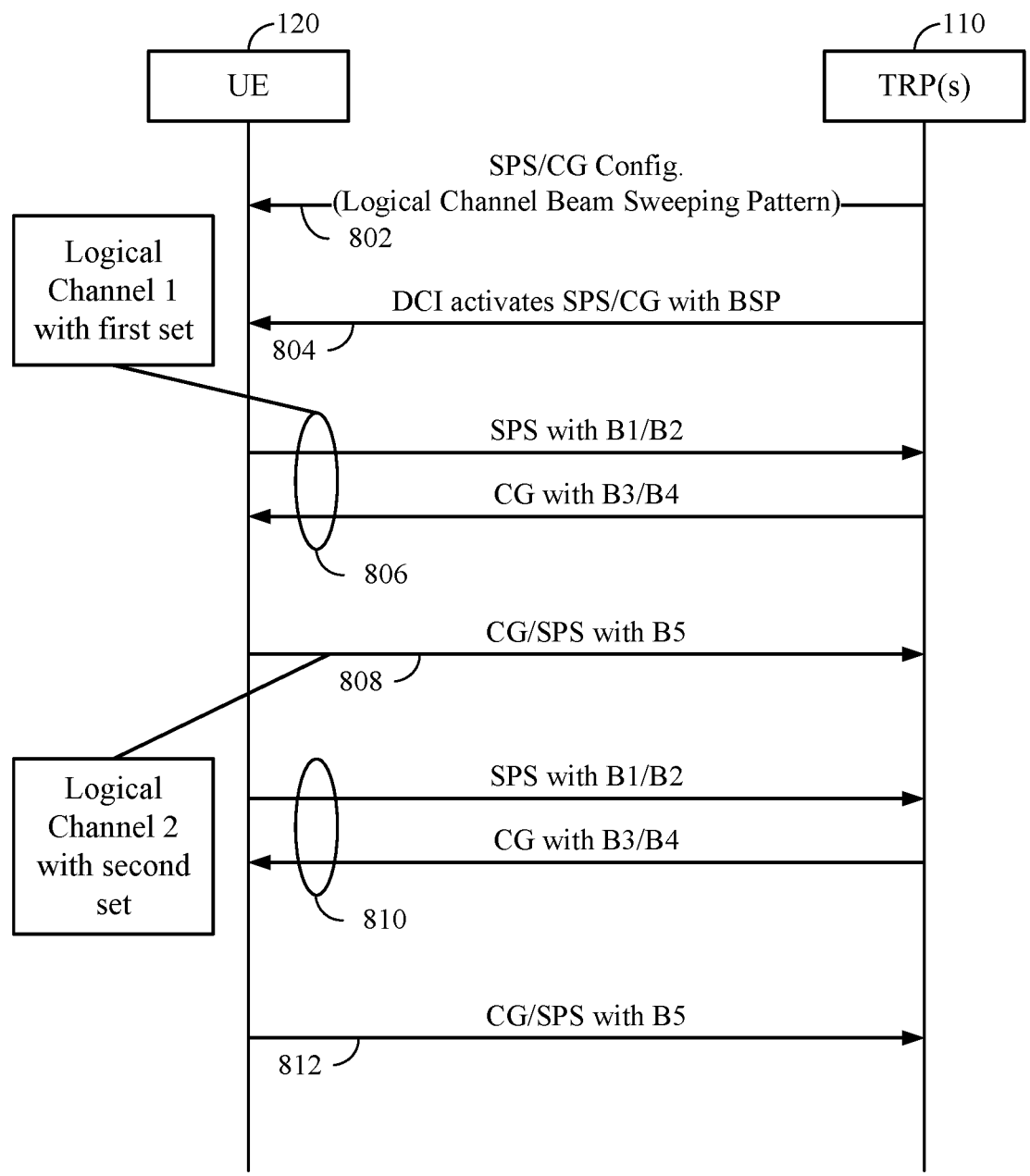
FIG. 8 is a signaling flow diagram illustrating examples of switching between beam sweeping patterns for logical channels, in accordance with certain aspects of the present disclosure.

FIG. 8 is a signaling flow diagram illustrating examples of switching between beam sweeping patterns for logical channels, in accordance with certain aspects of the present disclosure. At 802, the UE 120 may receive, from the BS 110, SPS and/or CG configuration(s) providing beam sweeping patterns triggered based on logical channels for the SPS/CG occasions. For example, the UE 120 may receive a first set of repetition and beam sweeping patterns for a first logical channel (e.g., an URLLC service) associated with a specific SPS/CG configuration and a second set of repetition and beam sweeping patters for a second logical channel (e.g., an eMBB service) associated with a specific SPS/CG configuration.

At 804, the UE 120 may receive, from the BS 110, DCI activating the SPS/CG configuration(s) with certain beam sweeping patterns for logical channels.

At 806, the UE 120 may communicate with the BS 110 through the first logical channel using the first set of repetition and beam sweeping patterns. In response to using the first logical channel for communications, the UE 120 may use the first beam sweeping pattern to communicate with the BS 110. The first set of repetition and beam sweeping patterns can be configured to match a specific level (or category) of quality of service (e.g., URLLC or automation traffic) associated with the first logical channel (e.g., multiple repetitions of the data block with multiple beams). For example, in an SPS occasion at 806, the UE 120 may monitor for two instances of a downlink data block via a first beam (B1) and a second beam (B2) from the BS 110, where each instance of the data block uses a separate beam in the sequence of beams of the beam sweeping pattern. In an overlapping CG occasion at 806, the UE 120 may transmit, to the BS 110, two instances of an uplink data block via a third beam (B3) and a fourth beam (B4). The spatial diversity provided by the different beams for the transmission occasions may improve the reliability and/or latency of communications between the UE 120 and BS 110. The repetitions provided by the beam sweeping pattern may also improve the reliability and/or latency of the communications between the UE 120 and BS 110.

At 808, the UE 120 may communicate with the BS 110 through the second logical channel using the second set of repetition and beam sweeping patterns. With the transition from the first logical channel to the second logical channel, the UE 120 may use a different beam sweeping pattern (e.g., a different number of repetitions and/or sequence of beams) for the second logical channel. In response to using the second logical channel for communications, the UE 120 may use the second beam sweeping pattern for communicating with the BS 110. For example, in a CG occasion at 808, the UE 120 may transmit, to the BS 110, a single instance of an uplink data block via a fifth beam (B5). In this example, the second logical channel (e.g., an eMBB service) may have a different level of quality of service than the first logical channel (e.g., an URLLC service), such that the second set of repetition and beam sweeping patterns can be configured to match the level (or category) of quality of service (e.g., eMBB or conversational voice traffic) associated with the second logical channel (e.g., a single instance of the data block with a single beam).

At 810, the UE 120 may again communicate with the BS 110 through the first logical channel using the first set of repetition and beam sweeping patterns. At 812, the UE 120 may again communicate with the BS 110 through the second logical channel using the second set of repetition and beam sweeping patterns.

Figure 9:
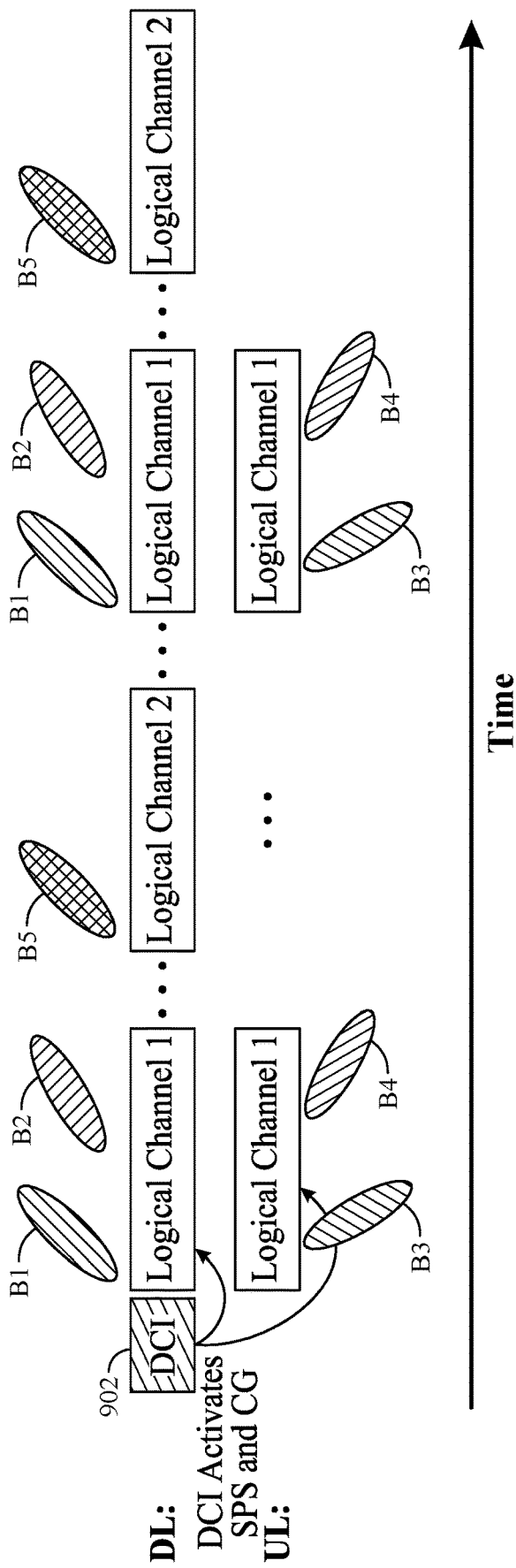
FIG. 9 is a timing diagram illustrating examples of beam sweeping patterns configured for logical channels as described herein with respect to FIG. 8, in accordance with certain aspects of the present disclosure.

FIG. 9 is a timing diagram illustrating examples of beam sweeping patterns configured for logical channels as described herein with respect to FIG. 8, in accordance with certain aspects of the present disclosure. In this example, the UE may receive the DCI 902 that activates an SPS configuration and/or CG configuration, for example, at 804 depicted in FIG. 8. In the first logical channel (Logical Channel 1), the UE may use the first set of repetition and beam sweeping patterns to communicate with the BS, for example, as described herein with respect to FIG. 8. As an example, the UE may monitor for a first instance of a downlink data block via the first beam (B1) and a second instance of the downlink data block (e.g., a repetition or retransmission of the data block) via the second beam (B2) from the BS 110. The UE may transmit, to the BS, a first instance of a uplink data block via the third beam (B3) and a second instance of the uplink data block (e.g., a repetition or retransmission of the data block) via the fourth beam (B4). In the second logical channel (Logical Channel 2), the UE may use the second set of repetition and beam sweeping patterns to communication with the BS. For example, the UE may monitor for a first instance of the data block via the fifth beam (B5). The transmission occasions for the first and second logical channels may be representative of SPS and/or CG occasions or dynamically scheduled transmission occasions.

It will be appreciated that the beam sweeping patterns depicted in FIGS. 6-9 are described herein to facilitate understanding of the repetitions and sequence of beams of a beam sweeping pattern. Other examples of beam sweeping patterns may be used in addition to or instead of those illustrated.

Example Methods of Beam Sweeping Pattern Switching

Figure 10:
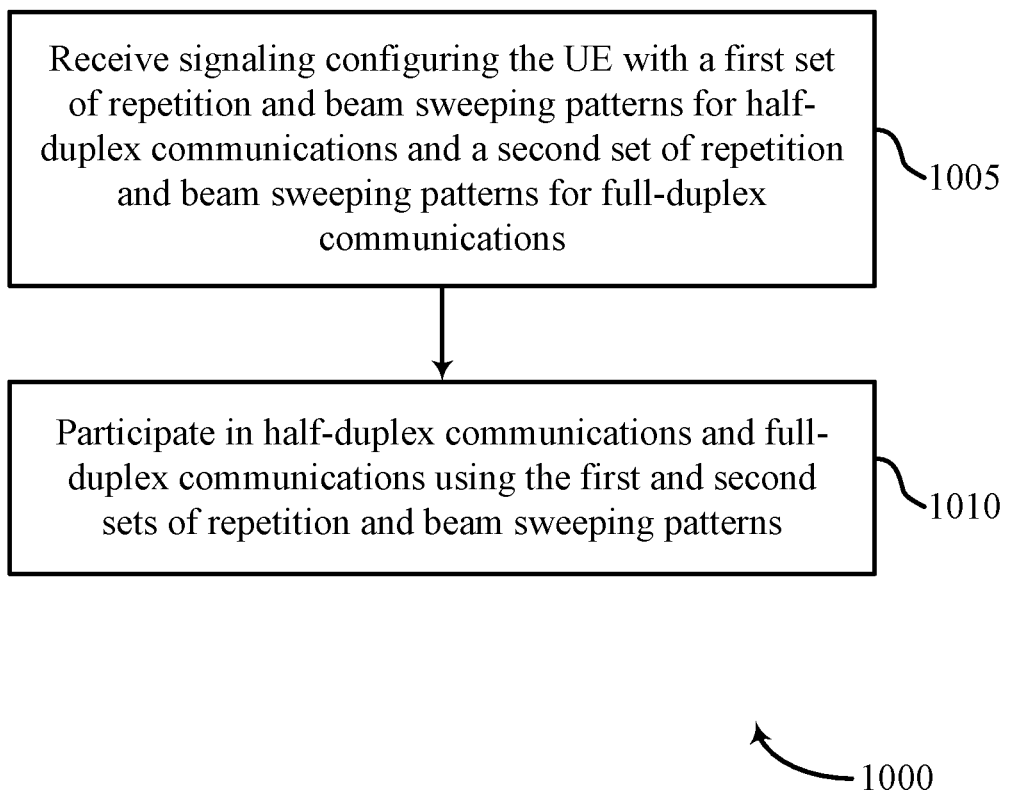
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. In some aspects, a user equipment, such as UE 120 of FIGS. 1 and 2, or processing system 1405 of FIG. 14, may perform the operations 1000. The operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

At operation 1005, the UE receives signaling configuring the UE with a first set of repetition and beam sweeping patterns for half-duplex communications and a second set of repetition and beam sweeping patterns for full-duplex communications. In some cases, the operations of this step refer to, or may be performed by, beam configuration circuitry as described with reference to FIG. 14. For example, the UE may receive, from a network entity (e.g., the BS 110), RRC signaling providing CG and SPS configurations associated with certain beam sweeping patterns.

At operation 1010, the UE participates in half-duplex communications and full-duplex communications using the first and second sets of repetition and beam sweeping patterns. In some cases, the operations of this step refer to, or may be performed by, communications circuitry as described with reference to FIG. 14. For example, the UE may communicate in a half-duplex mode using the first set of repetition and beam sweeping patterns and communicate in a full-duplex mode using the second set of repetition and beam sweeping patterns. In certain aspects, the UE may communicate at operation 1010 with a network entity (e.g., BS 110).

In some aspects, the participating at operation 1010 comprises using the first set of repetition and beam sweeping patterns for at least one of transmitting PUSCHs in first CG occasions that are non-overlapping with SPS occasions, or monitoring for PDSCHs in first SPS occasions that are non-overlapping with CG occasions. In some aspects, the participating at operation 1010 comprises using the second set of repetition and beam sweeping patterns for transmitting PUSCHs in second CG occasions that are overlapping with SPS occasions and monitoring for PDSCHs in second SPS occasions that are overlapping with CG occasions.

In some aspects, each beam sweeping pattern has a number of one or more repetitions and a sequence of one or more beams per at least one of one or more SPS occasions or one or more CG occasions. In some aspects, the first set of repetition and beam sweeping patterns is different than the second set of repetition and beam sweeping patterns. In some aspects, the first set of repetition and beam sweeping patterns has at least one of a different number of repetitions or a different sequence of one or more beams than the second set of repetition and beam sweeping patterns.

In some aspects, the first set of repetition and beam sweeping patterns has a single beam without repetitions, and the second set of repetition and beam sweeping patterns has a sequence of beams with repetitions.

In some aspects, receiving the signaling at operation 1005 comprises receiving the signaling via at least one of DCI or RRC signaling.

Figure 11:
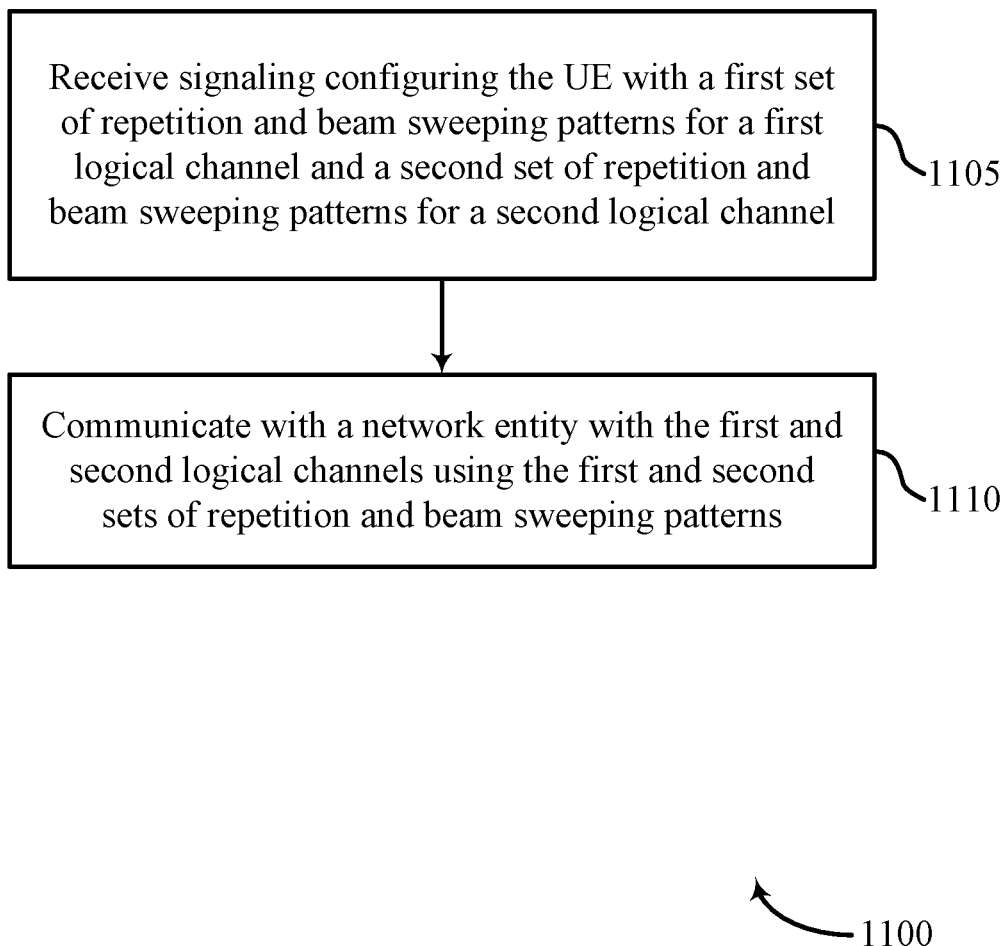
FIG. 11 is a flow diagram illustrating example operations for wireless communication by a UE, in accordance with certain aspects of the present disclosure.

FIG. 11 a flow diagram illustrating example operations 1100 for wireless communication, in accordance with certain aspects of the present disclosure. In some aspects, a user equipment, such as UE 120 of FIGS. 1 and 2, or processing system 1405 of FIG. 14, may perform the operations 1100. The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

At operation 1105, the UE receives signaling configuring the UE with a first set of repetition and beam sweeping patterns for a first logical channel and a second set of repetition and beam sweeping patterns for a second logical channel. In some cases, the operations of this step refer to, or may be performed by, beam configuration circuitry as described with reference to FIG. 14. For example, the UE may receive, from a network entity, RRC signaling providing certain beam sweeping patterns associated with one or more logical channels.

At operation 1110, the UE communicates with a network entity (e.g., BS 110) with the first and second logical channels using the first and second sets of repetition and beam sweeping patterns. In some cases, the operations of this step refer to, or may be performed by, communications circuitry as described with reference to FIG. 14. For example, the UE may communicate through the first logical channel using the first set of repetition and beam sweeping patterns and communicate through the second logical channel using the second set of repetition and beam sweeping patterns.

In some aspects, the communicating at operation 1110 comprises using the first set of repetition and beam sweeping patterns for at least one of transmitting PUSCHs in first CG occasions that are associated with the first logical channel, or monitoring for PDSCHs in first SPS occasions that associated with the first logical channel. In some aspects, the communicating at operation 1110 comprises using the second set of repetition and beam sweeping patterns for at least one of transmitting PUSCHs in second CG occasions that are associated with the second logical channel, or monitoring for PDSCHs in second SPS occasions that associated with the second logical channel.

In some aspects, each beam sweeping pattern has a number of one or more repetitions and a sequence of one or more beams per transmission occasion. In some aspects, the first set of repetition and beam sweeping patterns is different than the second set of repetition and beam sweeping patterns. In some aspects, the first set of repetition and beam sweeping patterns has at least one of a different number of repetitions or a different sequence of one or more beams than the second set of repetition and beam sweeping patterns.

In some aspects, each of the first and second logical channels includes at least one of a type of communication service, a quality of service flow identifier, a network slice, or a data radio bearer. In some aspects, the type of communication service includes an URLLC service or an eMBB service.

In some aspects, receiving the signaling at operation 1105 comprises receiving the signaling via at least one of DCI or RRC signaling.

Figure 12:
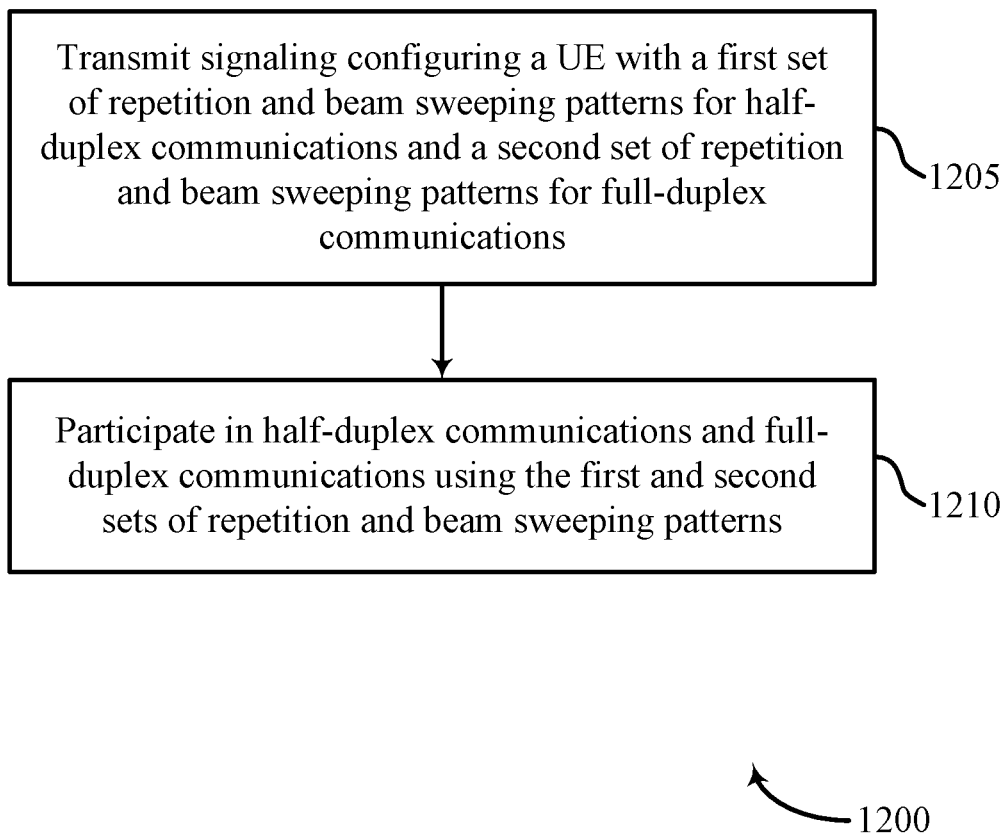
FIG. 12 is a flow diagram illustrating example operations for wireless communication by a network entity, in accordance with certain aspects of the present disclosure.

FIG. 12 is a flow diagram illustrating example operations 1200 for wireless communication, in accordance with certain aspects of the present disclosure. In some aspects, a network entity, such as base station 110 of FIGS. 1 and 2, or processing system 1505 of FIG. 15, may perform the operations 1200. The operations 1200 may be complementary to the operations 1000 performed by the UE. The operations 1200 may be implemented as software components that are executed and run on one or more processors (e.g., controller/processor 240 of FIG. 2). Further, the transmission and reception of signals by the network entity in operations 1200 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. As used herein, the network entity may refer to a wireless communication device in a radio access network, such as a base station, a remote radio head or antenna panel in communication with a base station, and/or network controller.

At operation 1205, the network entity transmits signaling configuring a UE with a first set of repetition and beam sweeping patterns for half-duplex communications and a second set of repetition and beam sweeping patterns for full-duplex communications. In some cases, the operations of this step refer to, or may be performed by, UE beam configuration circuitry as described with reference to FIG. 15. For example, the network entity may transmit, to a UE (e.g., the UE 120), RRC signaling providing CG and SPS configurations associated with certain beam sweeping patterns.

At operation 1210, the network entity participates in half-duplex communications and full-duplex communications using the first and second sets of repetition and beam sweeping patterns. In some cases, the operations of this step refer to, or may be performed by, UE communications circuitry as described with reference to FIG. 15.

In some aspects, the participating at operation 1210 comprises using the first set of repetition and beam sweeping patterns for at least one of monitoring for PUSCHs in first CG occasions that are non-overlapping with SPS occasions, or transmitting PDSCHs in first SPS occasions that are non-overlapping with CG occasions. In some aspects, the participating at operation 1210 comprises using the second set of repetition and beam sweeping patterns for monitoring for PUSCHs in second CG occasions that are overlapping with SPS occasions and transmitting PDSCHs in second SPS occasions that are overlapping with CG occasions.

In some aspects, each beam sweeping pattern has a number of one or more repetitions and a sequence of one or more beams per at least one of one or more SPS occasions or one or more CG occasions. In some aspects, the first set of repetition and beam sweeping patterns is different than the second set of repetition and beam sweeping patterns. In some aspects, the first set of repetition and beam sweeping patterns has at least one of a different number of repetitions or a different sequence of one or more beams than the second set of repetition and beam sweeping patterns.

In some aspects, the first set of repetition and beam sweeping patterns has a single beam without repetitions, and the second set of repetition and beam sweeping patterns has a sequence of beams with repetitions.

In some aspects, transmitting the signaling at operation 1205 comprises transmitting the signaling via at least one of DCI or RRC signaling.

Figure 13:
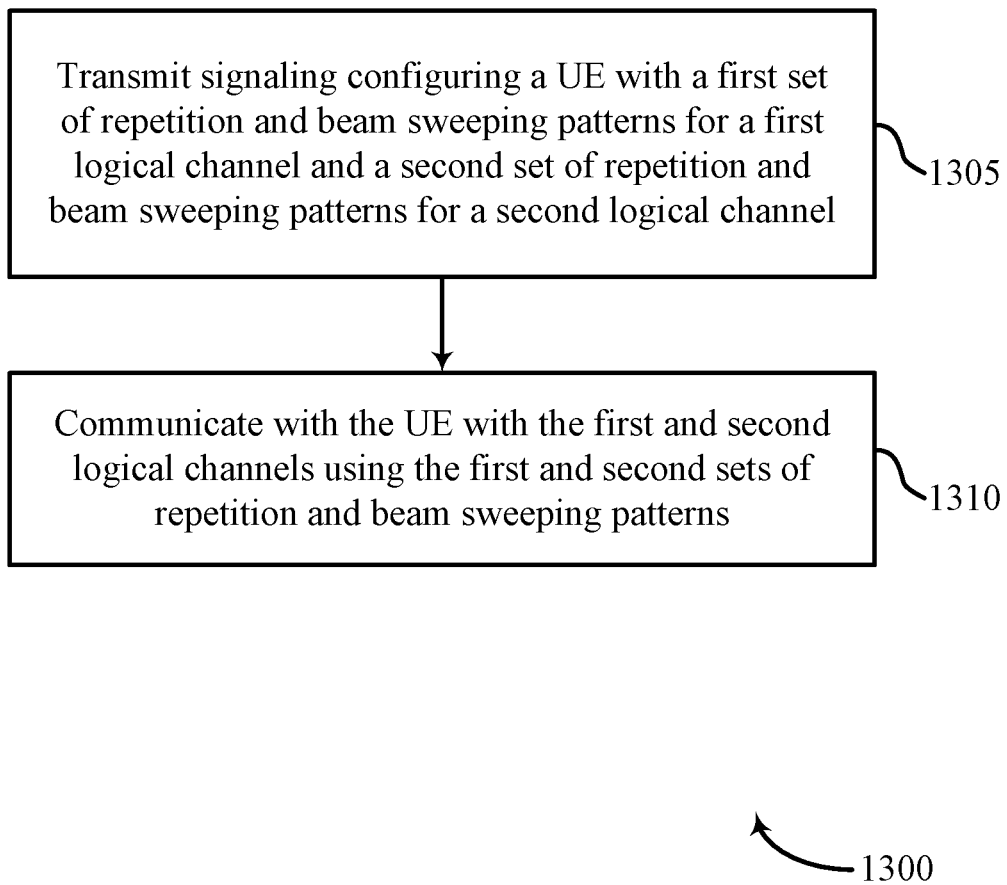
FIG. 13 is a flow diagram illustrating example operations for wireless communication by a network entity, in accordance with certain aspects of the present disclosure.

FIG. 13 is a flow diagram illustrating example operations 1300 for wireless communication, in accordance with certain aspects of the present disclosure. In some aspects, a network entity, such as base station 110 of FIGS. 1 and 2, or processing system 1505 of FIG. 15, may perform the operations 1300. The operations 1300 may be complementary to the operations 1100 performed by the UE. The operations 1300 may be implemented as software components that are executed and run on one or more processors (e.g., controller/processor 240 of FIG. 2). Further, the transmission and reception of signals by the network entity in operations 1300 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

At operation 1305, the network entity transmits signaling configuring a UE with a first set of repetition and beam sweeping patterns for a first logical channel and a second set of repetition and beam sweeping patterns for a second logical channel. In some cases, the operations of this step refer to, or may be performed by, UE beam configuration circuitry as described with reference to FIG. 15. For example, the network entity may transmit, to a UE (e.g., the UE 120), RRC signaling providing certain beam sweeping patterns associated with one or more logical channels.

At operation 1310, the network entity communicates with the UE with the first and second logical channels using the first and second sets of repetition and beam sweeping patterns. In some cases, the operations of this step refer to, or may be performed by, UE communications circuitry as described with reference to FIG. 15. For example, the network entity may communicate through the first logical channel using the first set of repetition and beam sweeping patterns and communicate through the second logical channel using the second set of repetition and beam sweeping patterns.

In some aspects, the communicating at operation 1310 comprises using the first set of repetition and beam sweeping patterns for at least one of transmitting PUSCHs in first CG occasions that are associated with the first logical channel, or monitoring for PDSCHs in first SPS occasions that associated with the first logical channel. In some aspects, the communicating at operation 1310 comprises using the second set of repetition and beam sweeping patterns for at least one of transmitting PUSCHs in second CG occasions that are associated with the second logical channel, or monitoring for PDSCHs in second SPS occasions that associated with the second logical channel.

In some aspects, each beam sweeping pattern has a number of one or more repetitions and a sequence of one or more beams per transmission occasion. In some aspects, the first set of repetition and beam sweeping patterns is different than the second set of repetition and beam sweeping patterns. In some aspects, the first set of repetition and beam sweeping patterns has at least one of a different number of repetitions or a different sequence of one or more beams than the second set of repetition and beam sweeping patterns.

In some aspects, each of the first and second logical channels includes at least one of a type of communication service, a quality of service flow identifier, a network slice, or a data radio bearer. In some aspects, the type of communication service includes an URLLC service or an eMBB service.

In some aspects, transmitting the signaling at operation 1305 comprises transmitting the signaling via at least one of DCI or RRC signaling.

Example Wireless Communication Devices

Figure 14:
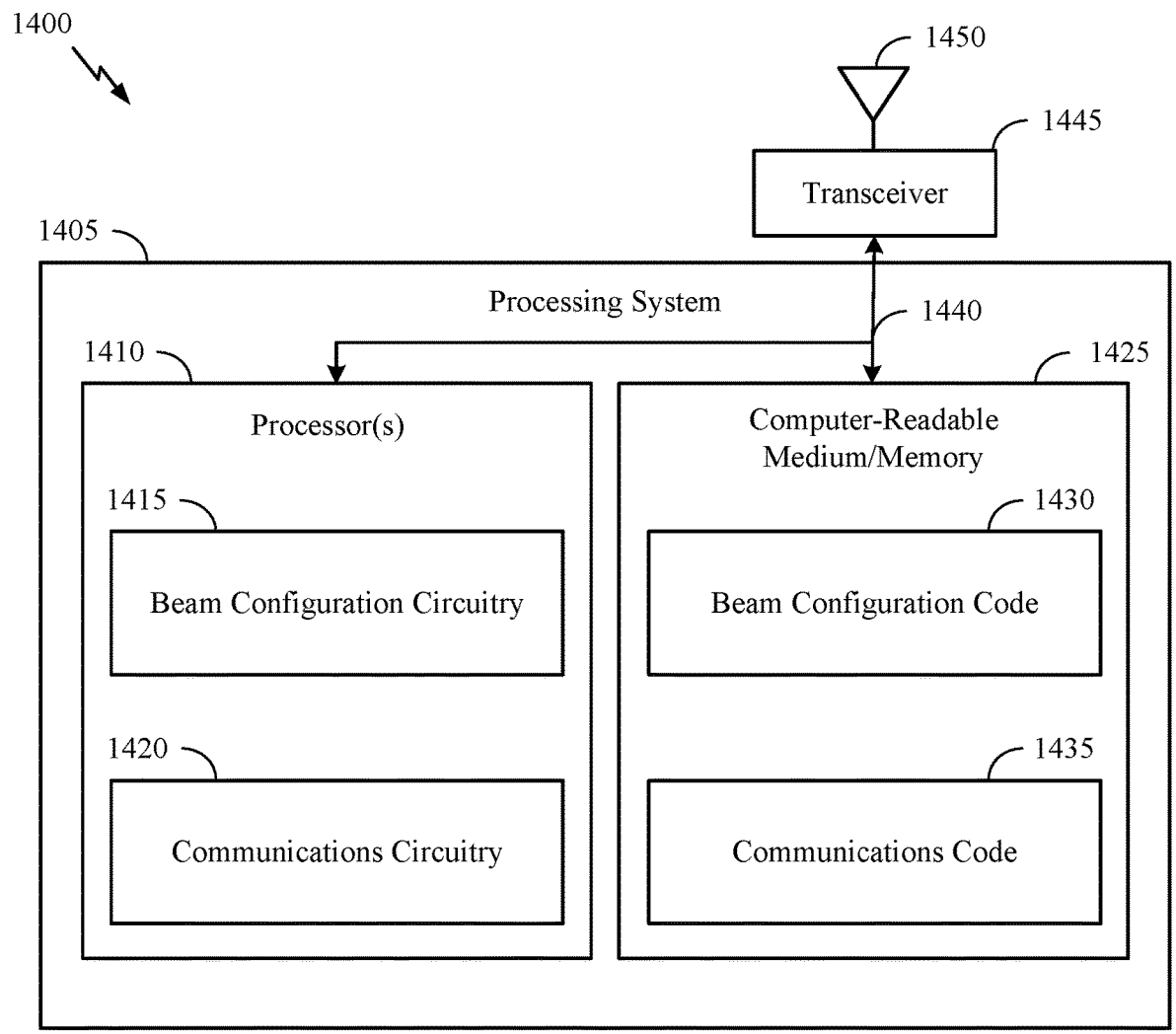
FIG. 14 illustrates a communications device (e.g., a UE) that may include various components configured to perform operations for the techniques disclosed herein in accordance with aspects of the present disclosure.

FIG. 14 depicts an example communications device 1400 that includes various components operable, configured, or adapted to perform operations for the techniques disclosed herein, such as the operations depicted and described with respect to FIGS. 10 and 11. In some examples, communication device may be a user equipment 120 as described, for example with respect to FIGS. 1 and 2.

Communications device 1400 includes a processing system 1405 coupled to a transceiver 1445 (e.g., a transmitter and/or a receiver). Transceiver 1445 is configured to transmit (or send) and receive signals for the communications device 1400 via an antenna 1450, such as the various signals as described herein. A transceiver 1445 may communicate bi-directionally, via antennas 1450, wired, or wireless links as described above. For example, the transceiver 1445 may represent a wireless transceiver 1445 and may communicate bi-directionally with another wireless transceiver 1445. The transceiver 1445 may also include or be connected to a modem to modulate the packets and provide the modulated packets to for transmission, and to demodulate received packets. In some examples, transceiver 1445 may be tuned to operate at specified frequencies. For example, a modem can configure the transceiver 1445 to operate at a specified frequency and power level based on the communication protocol used by the modem.

Processing system 1405 may be configured to perform processing functions for communications device 1400, including processing signals received and/or to be transmitted by communications device 1400. Processing system 1405 includes one or more processors 1410 coupled to a computer-readable medium/memory 1425 via a bus 1440.

In some examples, one or more processors 1410 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1410 are configured to operate a memory array using a memory controller. In other cases, a memory controller is integrated into the one or more processors 1410. In some cases, the one or more processors 1410 are configured to execute computer-readable instructions stored in a memory to perform various functions. In some embodiments, one or more processors 1410 include special purpose components for modem processing, baseband processing, digital signal processing, or transmission processing.

In certain aspects, computer-readable medium/memory 1425 is configured to store instructions (e.g., computer-executable code) that when executed by the one or more processors 1410, cause the one or more processors 1410 to perform the operations illustrated in FIGS. 10 and 11, or other operations for performing the various techniques discussed herein.

In one aspect, computer-readable medium/memory 1425 includes beam configuration code 1430 and communications code 1435.

Examples of a computer-readable medium/memory 1425 include random access memory (RAM), read-only memory (ROM), solid state memory, a hard drive, a hard disk drive, etc. In some examples, computer-readable medium/memory 1425 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1400 may provide means for performing the methods described herein, including with respect to FIGS. 10 and 11.

In some examples, means for transmitting or sending (or means for outputting for transmission) or means for communicating (or means for participating in communications) may include the transceivers 254 and/or antenna(s) 252 of the user equipment 120 illustrated in FIG. 2 and/or transceiver 1445 and antenna 1450 of the communication device in FIG. 14.

In some examples, means for receiving (or means for obtaining) or means for communicating (or means for participating in communications) may include the transceivers 254 and/or antenna(s) 252 of the user equipment 120 illustrated in FIG. 2 and/or transceiver 1445 and antenna 1450 of the communication device in FIG. 14.

In some examples, means for participating may include various processing system 1405 components, such as: the one or more processors 1410 in FIG. 14, or aspects of the user equipment 120 depicted in FIG. 2, including receive processor 258, transmit processor 264, TX MIMO processor 266, and/or controller/processor 280.

In one aspect, one or more processors 1410 includes beam configuration circuitry 1415 and communications circuitry 1420.

According to some aspects, beam configuration circuitry 1415 receives signaling configuring the UE with a first set of repetition and beam sweeping patterns for half-duplex communications and a second set of repetition and beam sweeping patterns for full-duplex communications. In some aspects, each beam sweeping pattern has a number of one or more repetitions and a sequence of one or more beams per at least one of one or more SPS occasions or one or more CG occasions. In some aspects, the first set of repetition and beam sweeping patterns is different than the second set of repetition and beam sweeping patterns. In some aspects, the first set of repetition and beam sweeping patterns has at least one of a different number of repetitions or a different sequence of one or more beams than the second set of repetition and beam sweeping patterns. In some aspects, the first set of repetition and beam sweeping patterns has a single beam without repetitions, and the second set of repetition and beam sweeping patterns has a sequence of beams with repetitions. In some examples, beam configuration circuitry 1415 receives the signaling configuring the UE via at least one of DCI or RRC signaling.

According to some aspects, communications circuitry 1420 participates in half-duplex communications and full-duplex communications using the first and second sets of repetition and beam sweeping patterns. In some aspects, the participating includes: using the first set of repetition and beam sweeping patterns for at least one of transmitting PUSCHs in first CG occasions that are non-overlapping with SPS occasions, or monitoring for PDSCHs in first SPS occasions that are non-overlapping with CG occasions; and using the second set of repetition and beam sweeping patterns for transmitting PUSCHs in second CG occasions that are overlapping with SPS occasions and monitoring for PDSCHs in second SPS occasions that are overlapping with CG occasions.

According to some aspects, beam configuration circuitry 1415 receives signaling configuring the UE with a first set of repetition and beam sweeping patterns for a first logical channel and a second set of repetition and beam sweeping patterns for a second logical channel. In some aspects, each beam sweeping pattern has a number of one or more repetitions and a sequence of one or more beams per transmission occasion. In some aspects, the first set of repetition and beam sweeping patterns is different than the second set of repetition and beam sweeping patterns. In some aspects, the first set of repetition and beam sweeping patterns has at least one of a different number of repetitions or a different sequence of one or more beams than the second set of repetition and beam sweeping patterns. In some examples, beam configuration circuitry 1415 receives the signaling configuring the UE via at least one of DCI or RRC signaling.

According to some aspects, communications circuitry 1420 communicates with a network entity with the first and second logical channels using the first and second sets of repetition and beam sweeping patterns. In some aspects, the communicating includes: using the first set of repetition and beam sweeping patterns for at least one of transmitting PUSCHs in first CG occasions that are associated with the first logical channel, or monitoring for PDSCHs in first SPS occasions that associated with the first logical channel; and using the second set of repetition and beam sweeping patterns for at least one of transmitting PUSCHs in second CG occasions that are associated with the second logical channel, or monitoring for PDSCHs in second SPS occasions that associated with the second logical channel. In some aspects, each of the first and second logical channels includes at least one of a type of communication service, a quality of service flow identifier, a network slice, or a data radio bearer. In some aspects, the type of communication service includes an URLLC service or an eMBB service.

Notably, FIG. 14 is an example, and many other examples and configurations of communication device are possible.

Figure 15:
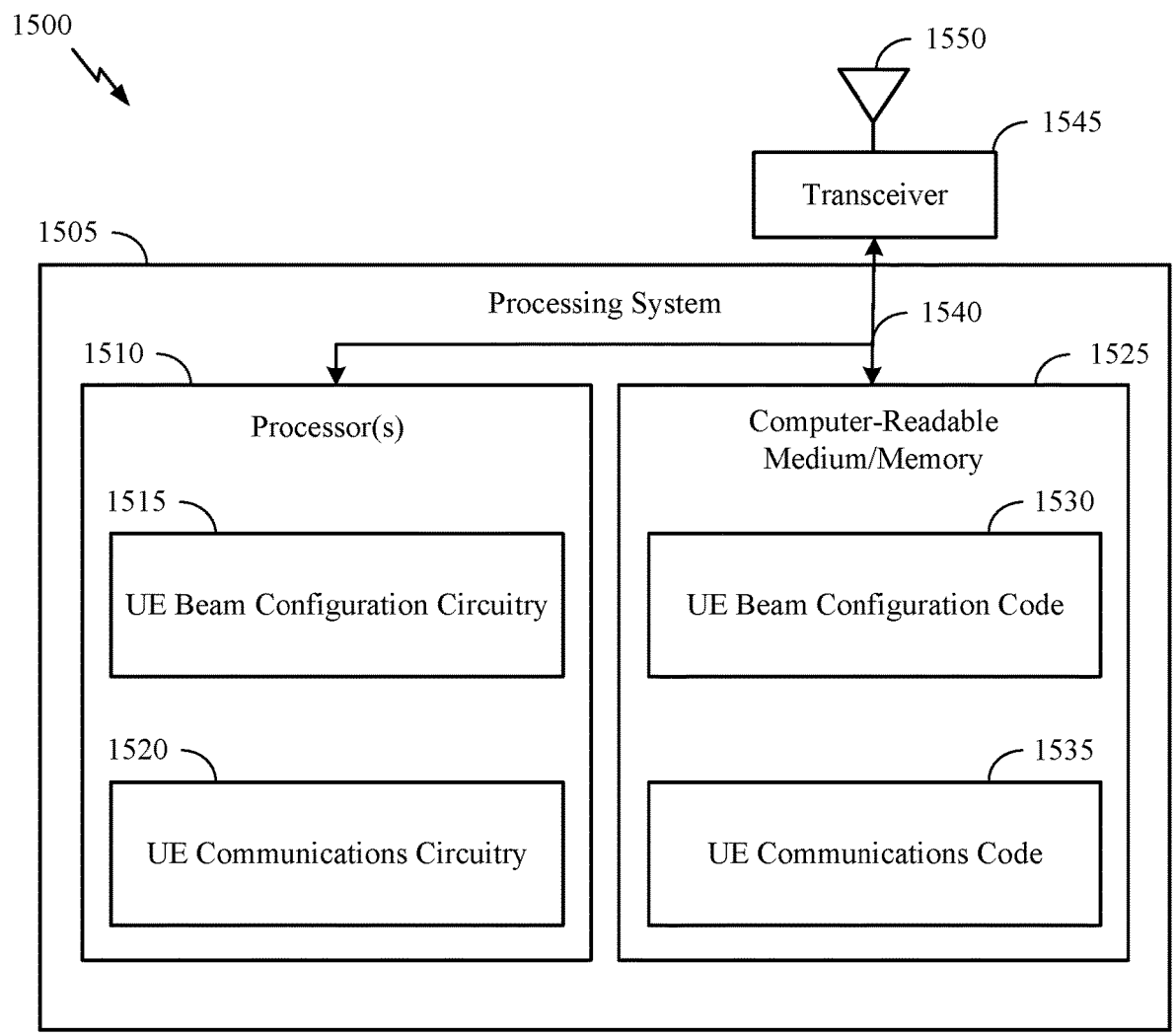
FIG. 15 illustrates a communications device (e.g., a BS) that may include various components configured to perform operations for the techniques disclosed herein in accordance with aspects of the present disclosure.

FIG. 15 depicts an example communications device 1500 that includes various components operable, configured, or adapted to perform operations for the techniques disclosed herein, such as the operations depicted and described with respect to FIGS. 12 and 13. In some examples, communication device may be a base station 110 as described, for example with respect to FIGS. 1 and 2.

Communications device 1500 includes a processing system 1505 coupled to a transceiver 1545 (e.g., a transmitter and/or a receiver). Transceiver 1545 is configured to transmit (or send) and receive signals for the communications device 1500 via an antenna 1550, such as the various signals as described herein. In some aspects, transceiver 1545 is an example of, or includes aspects of, the corresponding element described with reference to FIG. 14.

Processing system 1505 may be configured to perform processing functions for communications device 1500, including processing signals received and/or to be transmitted by communications device 1500. Processing system 1505 includes one or more processors 1510 coupled to a computer-readable medium/memory 1525 via a bus 1540. In certain aspects, computer-readable medium/memory 1525 is configured to store instructions (e.g., computer-executable code) that when executed by the one or more processors 1510, cause the one or more processors 1510 to perform the operations illustrated in FIGS. 12 and 13, or other operations for performing the various techniques discussed herein.

In one aspect, computer-readable medium/memory 1525 includes UE beam configuration code 1530 and UE communications code 1535. In some aspects, computer-readable medium/memory 1525 is an example of, or includes aspects of, the corresponding element described with reference to FIG. 14.

Various components of communications device 1500 may provide means for performing the methods described herein, including with respect to FIGS. 12 and 13.

In some examples, means for transmitting or sending (or means for outputting for transmission) or means for communicating (or means for participating in communications) may include the transceivers 232 and/or antenna(s) 234 of the base station 110 illustrated in FIG. 2 and/or transceiver 1545 and antenna 1550 of the communication device in FIG. 15.

In some examples, means for receiving (or means for obtaining) or means for communicating (or means for participating in communications) may include the transceivers 232 and/or antenna(s) 234 of the base station 110 illustrated in FIG. 2 and/or transceiver 1545 and antenna 1550 of the communication device in FIG. 15.

In some examples, means for participating may include various processing system 1505 components, such as: the one or more processors 1510 in FIG. 15, or aspects of the user equipment 120 depicted in FIG. 2, including receive processor 258, transmit processor 264, TX MIMO processor 266, and/or controller/processor 280.

In one aspect, one or more processors 1510 includes UE beam configuration circuitry 1515 and UE communications circuitry 1520. In some aspects, one or more processors 1510 are examples of, or include aspects of, the corresponding element described with reference to FIG. 14.

According to some aspects, UE beam configuration circuitry 1515 transmits signaling configuring a UE with a first set of repetition and beam sweeping patterns for half-duplex communications and a second set of repetition and beam sweeping patterns for full-duplex communications. In some aspects, each beam sweeping pattern has a number of one or more repetitions and a sequence of one or more beams per at least one of one or more SPS occasions or one or more CG occasions. In some aspects, the first set of repetition and beam sweeping patterns is different than the second set of repetition and beam sweeping patterns. In some aspects, the first set of repetition and beam sweeping patterns has at least one of a different number of repetitions or a different sequence of one or more beams than the second set of repetition and beam sweeping patterns. In some aspects, the first set of repetition and beam sweeping patterns has a single beam without repetitions, and the second set of repetition and beam sweeping patterns has a sequence of beams with repetitions. In some examples, UE beam configuration circuitry 1515 transmits the signaling configuring the UE via at least one of DCI or RRC signaling.

According to some aspects, UE communications circuitry 1520 participates in half-duplex communications and full-duplex communications using the first and second sets of repetition and beam sweeping patterns. In some aspects, the participating in communications includes: using the first set of repetition and beam sweeping patterns for at least one of monitoring for PUSCHs in first CG occasions that are non-overlapping with SPS occasions, or transmitting PDSCHs in first SPS occasions that are non-overlapping with CG occasions; and using the second set of repetition and beam sweeping patterns for monitoring for PUSCHs in second CG occasions that are overlapping with SPS occasions and transmitting PDSCHs in second SPS occasions that are overlapping with CG occasions.

According to some aspects, UE beam configuration circuitry 1515 transmits signaling configuring a UE with a first set of repetition and beam sweeping patterns for a first logical channel and a second set of repetition and beam sweeping patterns for a second logical channel. In some aspects, each beam sweeping pattern has a number of one or more repetitions and a sequence of one or more beams per transmission occasion. In some aspects, the first set of repetition and beam sweeping patterns is different than the second set of repetition and beam sweeping patterns. In some aspects, the first set of repetition and beam sweeping patterns has at least one of a different number of repetitions or a different sequence of one or more beams than the second set of repetition and beam sweeping patterns. In some examples, UE beam configuration circuitry 1515 transmits the signaling configuring the UE via at least one of DCI or RRC signaling.

According to some aspects, UE communications circuitry 1520 communicates with the UE with the first and second logical channels using the first and second sets of repetition and beam sweeping patterns. In some aspects, the communicating includes: using the first set of repetition and beam sweeping patterns for at least one of transmitting PUSCHs in first CG occasions that are associated with the first logical channel, or monitoring for PDSCHs in first SPS occasions that associated with the first logical channel; and using the second set of repetition and beam sweeping patterns for at least one of transmitting PUSCHs in second CG occasions that are associated with the second logical channel, or monitoring for PDSCHs in second SPS occasions that associated with the second logical channel. In some aspects, each of the first and second logical channels includes at least one of a type of communication service, a quality of service flow identifier, a network slice, or a data radio bearer. In some aspects, the type of communication service includes an URLLC service or an eMBB service.

Notably, FIG. 15 is as an example, and many other examples and configurations of communication device are possible.

Example Aspects

In addition to the various aspects described above, specific combinations of aspects are within the scope of the disclosure, some of which are detailed below:

Aspect 1: A method of wireless communication by a user equipment (UE), comprising: receiving signaling configuring the UE with a first set of repetition and beam sweeping patterns for half-duplex communications and a second set of repetition and beam sweeping patterns for full-duplex communications; and participating in half-duplex communications and full-duplex communications using the first and second sets of repetition and beam sweeping patterns.

Aspect 2: The method of Aspect 1, wherein participating comprises: using the first set of repetition and beam sweeping patterns for at least one of transmitting physical uplink shared channels (PUSCHs) in first configured grant (CG) occasions that are non-overlapping with semi-persistent scheduling (SPS) occasions, or monitoring for physical downlink shared channels (PDSCHs) in first SPS occasions that are non-overlapping with CG occasions; and using the second set of repetition and beam sweeping patterns for transmitting PUSCHs in second CG occasions that are overlapping with SPS occasions and monitoring for PDSCHs in second SPS occasions that are overlapping with CG occasions.

Aspect 3: The method according to any of Aspects 1 or 2, wherein each beam sweeping pattern has a number of one or more repetitions and a sequence of one or more beams per at least one of one or more SPS occasions or one or more CG occasions.

Aspect 4: The method according to any of Aspects 1-3, wherein the first set of repetition and beam sweeping patterns is different than the second set of repetition and beam sweeping patterns.

Aspect 5: The method of Aspect 4, wherein the first set of repetition and beam sweeping patterns has at least one of a different number of repetitions or a different sequence of one or more beams than the second set of repetition and beam sweeping patterns.

Aspect 6: The method according to any of Aspects 1-5, wherein the first set of repetition and beam sweeping patterns has a single beam without repetitions, and the second set of repetition and beam sweeping patterns has a sequence of beams with repetitions.

Aspect 7: The method according to any of Aspects 1-6, wherein receiving the signaling comprises receiving the signaling via at least one of downlink control information (DCI) or radio resource control (RRC) signaling.

Aspect 8: A method of wireless communication by a network entity, comprising: transmitting signaling configuring a user equipment (UE) with a first set of repetition and beam sweeping patterns for half-duplex communications and a second set of repetition and beam sweeping patterns for full-duplex communications; and participating in half-duplex communications and full-duplex communications using the first and second sets of repetition and beam sweeping patterns.

Aspect 9: The method of Aspect 8, wherein participating comprises: using the first set of repetition and beam sweeping patterns for at least one of monitoring for physical uplink shared channels (PUSCHs) in first configured grant (CG) occasions that are non-overlapping with semi-persistent scheduling (SPS) occasions, or transmitting physical downlink shared channels (PDSCHs) in first SPS occasions that are non-overlapping with CG occasions; and using the second set of repetition and beam sweeping patterns for monitoring for PUSCHs in second CG occasions that are overlapping with SPS occasions and transmitting PDSCHs in second SPS occasions that are overlapping with CG occasions.

Aspect 10: The method according to any of Aspects 8 or 9, wherein each beam sweeping pattern has a number of one or more repetitions and a sequence of one or more beams per at least one of one or more SPS occasions or one or more CG occasions.

Aspect 11: The method according to any of Aspects 8-10, wherein the first set of repetition and beam sweeping patterns is different than the second set of repetition and beam sweeping patterns.

Aspect 12: The method of Aspect 11, wherein the first set of repetition and beam sweeping patterns has at least one of a different number of repetitions or a different sequence of one or more beams than the second set of repetition and beam sweeping patterns.

Aspect 13: The method according to any of Aspects 8-12, wherein the first set of repetition and beam sweeping patterns has a single beam without repetitions, and the second set of repetition and beam sweeping patterns has a sequence of beams with repetitions.

Aspect 14: The method according to any of Aspects 8-13, wherein transmitting the signaling comprises transmitting the signaling via at least one of downlink control information (DCI) or radio resource control (RRC) signaling.

Aspect 15: A method of wireless communication by a user equipment (UE), comprising: receiving signaling configuring the UE with a first set of repetition and beam sweeping patterns for a first logical channel and a second set of repetition and beam sweeping patterns for a second logical channel; and communicating with a network entity with the first and second logical channels using the first and second sets of repetition and beam sweeping patterns.

Aspect 16: The method of Aspect 15, wherein communicating comprises: using the first set of repetition and beam sweeping patterns for at least one of transmitting physical uplink shared channels (PUSCHs) in first configured grant (CG) occasions that are associated with the first logical channel, or monitoring for physical downlink shared channels (PDSCHs) in first semi-persistent scheduling (SPS) occasions that associated with the first logical channel; and using the second set of repetition and beam sweeping patterns for at least one of transmitting PUSCHs in second CG occasions that are associated with the second logical channel, or monitoring for PDSCHs in second SPS occasions that associated with the second logical channel.

Aspect 17: The method according to any of Aspects 15 or 16, wherein each beam sweeping pattern has a number of one or more repetitions and a sequence of one or more beams per transmission occasion.

Aspect 18: The method according to any of Aspects 15-17, wherein the first set of repetition and beam sweeping patterns is different than the second set of repetition and beam sweeping patterns.

Aspect 19: The method of Aspect 18, wherein the first set of repetition and beam sweeping patterns has at least one of a different number of repetitions or a different sequence of one or more beams than the second set of repetition and beam sweeping patterns.

Aspect 20: The method according to any of Aspects 15-19, wherein each of the first and second logical channels includes at least one of a type of communication service, a quality of service flow identifier, a network slice, or a data radio bearer.

Aspect 21: The method of Aspect 20, wherein the type of communication service includes an ultra-reliable low latency communication (URLLC) service or an enhanced mobile broadband (eMBB) service.

Aspect 22: The method according to any of Aspects 15-21, wherein receiving the signaling comprises receiving the signaling via at least one of downlink control information (DCI) or radio resource control (RRC) signaling.

Aspect 23: A method of wireless communication by a network entity, comprising: transmitting signaling configuring a user equipment (UE) with a first set of repetition and beam sweeping patterns for a first logical channel and a second set of repetition and beam sweeping patterns for a second logical channel; and communicating with the UE with the first and second logical channels using the first and second sets of repetition and beam sweeping patterns.

Aspect 24: The method of Aspect 23, wherein communicating comprises: using the first set of repetition and beam sweeping patterns for at least one of transmitting physical uplink shared channels (PUSCHs) in first configured grant (CG) occasions that are associated with the first logical channel, or monitoring for physical downlink shared channels (PDSCHs) in first semi-persistent scheduling (SPS) occasions that associated with the first logical channel; and using the second set of repetition and beam sweeping patterns for at least one of transmitting PUSCHs in second CG occasions that are associated with the second logical channel, or monitoring for PDSCHs in second SPS occasions that associated with the second logical channel.

Aspect 25: The method according to any of Aspects 23 or 24, wherein each beam sweeping pattern has a number of one or more repetitions and a sequence of one or more beams per transmission occasion.

Aspect 26: The method according to any of Aspects 23-25, wherein the first set of repetition and beam sweeping patterns is different than the second set of repetition and beam sweeping patterns.

Aspect 27: The method of Aspect 26, wherein the first set of repetition and beam sweeping patterns has at least one of a different number of repetitions or a different sequence of one or more beams than the second set of repetition and beam sweeping patterns.

Aspect 28: The method according to any of Aspects 23-27, wherein each of the first and second logical channels includes at least one of a type of communication service, a quality of service flow identifier, a network slice, or a data radio bearer.

Aspect 29: The method of Aspect 28, wherein the type of communication service includes an ultra-reliable low latency communication (URLLC) service or an enhanced mobile broadband (eMBB) service.

Aspect 30: The method according to any of Aspects 23-30, wherein transmitting the signaling comprises transmitting the signaling via at least one of downlink control information (DCI) or radio resource control (RRC) signaling.

Aspect 31: An apparatus, comprising: a memory comprising executable instructions; one or more processors configured to execute the executable instructions and cause the apparatus to perform a method in accordance with any one of Aspects 1-30.

Aspect 32: An apparatus, comprising means for performing a method in accordance with any one of Aspects 1-30.

Aspect 33: A computer-readable medium comprising executable instructions that, when executed by one or more processors of an apparatus, cause the apparatus to perform a method in accordance with any one of Aspects 1-30.

Aspect 34: A computer program product embodied on a computer-readable storage medium comprising code for performing a method in accordance with any one of Aspects 1-30.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 10, FIG. 11, FIG. 12, and/or FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method of wireless communication by a user equipment (UE), comprising:
receiving signaling configuring the UE with a first set of repetition and beam sweeping patterns for half-duplex communications and a second set of repetition and beam sweeping patterns for full-duplex communications; and
participating in half-duplex communications and full-duplex communications using the first and second sets of repetition and beam sweeping patterns, wherein participating comprises:
using the first set of repetition and beam sweeping patterns for at least one of transmitting physical uplink shared channels (PUSCHs) in first configured grant (CG) occasions that are non-overlapping with semi-persistent scheduling (SPS) occasions, or monitoring for physical downlink shared channels (PDSCHs) in first SPS occasions that are non-overlapping with CG occasions; and
using the second set of repetition and beam sweeping patterns for transmitting PUSCHs in second CG occasions that are overlapping with SPS occasions and monitoring for PDSCHs in second SPS occasions that are overlapping with CG occasions.

2. The method of claim 1, wherein each beam sweeping pattern has a number of one or more repetitions and a sequence of one or more beams per at least one of one or more SPS occasions or one or more CG occasions.

3. The method of claim 1, wherein the first set of repetition and beam sweeping patterns is different than the second set of repetition and beam sweeping patterns.

4. The method of claim 3, wherein the first set of repetition and beam sweeping patterns has at least one of a different number of repetitions or a different sequence of one or more beams than the second set of repetition and beam sweeping patterns.

5. The method of claim 1, wherein the first set of repetition and beam sweeping patterns has a single beam without repetitions, and the second set of repetition and beam sweeping patterns has a sequence of beams with repetitions.

6. The method of claim 1, wherein receiving the signaling comprises receiving the signaling via at least one of downlink control information (DCI) or radio resource control (RRC) signaling.

7. A method of wireless communication by a network entity, comprising:
transmitting signaling configuring a user equipment (UE) with a first set of repetition and beam sweeping patterns for half-duplex communications and a second set of repetition and beam sweeping patterns for full-duplex communications; and
participating in half-duplex communications and full-duplex communications using the first and second sets of repetition and beam sweeping patterns, wherein participating comprises:
using the first set of repetition and beam sweeping patterns for at least one of monitoring for physical uplink shared channels (PUSCHs) in first configured grant (CG) occasions that are non-overlapping with semi-persistent scheduling (SPS) occasions, or transmitting physical downlink shared channels (PDSCHs) in first SPS occasions that are non-overlapping with CG occasions; and
using the second set of repetition and beam sweeping patterns for monitoring for PUSCHs in second CG occasions that are overlapping with SPS occasions and transmitting PDSCHs in second SPS occasions that are overlapping with CG occasions.

8. The method of claim 7, wherein each beam sweeping pattern has a number of one or more repetitions and a sequence of one or more beams per at least one of one or more SPS occasions or one or more CG occasions.

9. The method of claim 7, wherein the first set of repetition and beam sweeping patterns is different than the second set of repetition and beam sweeping patterns.

10. The method of claim 9, wherein the first set of repetition and beam sweeping patterns has at least one of a different number of repetitions or a different sequence of one or more beams than the second set of repetition and beam sweeping patterns.

11. The method of claim 7, wherein the first set of repetition and beam sweeping patterns has a single beam without repetitions, and the second set of repetition and beam sweeping patterns has a sequence of beams with repetitions.

12. The method of claim 7, wherein transmitting the signaling comprises transmitting the signaling via at least one of downlink control information (DCI) or radio resource control (RRC) signaling.

13. A method of wireless communication by a user equipment (UE), comprising:
receiving signaling configuring the UE with a first set of repetition and beam sweeping patterns for a first logical channel and a second set of repetition and beam sweeping patterns for a second logical channel; and
communicating with a network entity with the first and second logical channels using the first and second sets of repetition and beam sweeping patterns, wherein communicating comprises:
using the first set of repetition and beam sweeping patterns for at least one of transmitting physical uplink shared channels (PUSCHs) in first configured grant (CG) occasions that are associated with the first logical channel, or monitoring for physical downlink shared channels (PDSCHs) in first semi-persistent scheduling (SPS) occasions that associated with the first logical channel; and
using the second set of repetition and beam sweeping patterns for at least one of transmitting PUSCHs in second CG occasions that are associated with the second logical channel, or monitoring for PDSCHs in second SPS occasions that associated with the second logical channel.

14. The method of claim 13, wherein each beam sweeping pattern has a number of one or more repetitions and a sequence of one or more beams per transmission occasion.

15. The method of claim 13, wherein the first set of repetition and beam sweeping patterns is different than the second set of repetition and beam sweeping patterns.

16. The method of claim 15, wherein the first set of repetition and beam sweeping patterns has at least one of a different number of repetitions or a different sequence of one or more beams than the second set of repetition and beam sweeping patterns.

17. The method of claim 13, wherein each of the first and second logical channels includes at least one of a type of communication service, a quality of service flow identifier, a network slice, or a data radio bearer.

18. The method of claim 17, wherein the type of communication service includes an ultra-reliable low latency communication (URLLC) service or an enhanced mobile broadband (eMBB) service.

19. The method of claim 13, wherein receiving the signaling comprises receiving the signaling via at least one of downlink control information (DCI) or radio resource control (RRC) signaling.

20. A method of wireless communication by a network entity, comprising:
    transmitting signaling configuring a user equipment (UE) with a first set of repetition and beam sweeping patterns for a first logical channel and a second set of repetition and beam sweeping patterns for a second logical channel; and
    communicating with the UE with the first and second logical channels using the first and second sets of repetition and beam sweeping patterns, wherein communicating comprises:
        using the first set of repetition and beam sweeping patterns for at least one of transmitting physical uplink shared channels (PUSCHs) in first configured grant (CG) occasions that are associated with the first logical channel, or monitoring for physical downlink shared channels (PDSCHs) in first semi-persistent scheduling (SPS) occasions that associated with the first logical channel; and
        using the second set of repetition and beam sweeping patterns for at least one of transmitting PUSCHs in second CG occasions that are associated with the second logical channel, or monitoring for PDSCHs in second SPS occasions that associated with the second logical channel.

21. The method of claim 20, wherein each beam sweeping pattern has a number of one or more repetitions and a sequence of one or more beams per transmission occasion.

22. The method of claim 20, wherein the first set of repetition and beam sweeping patterns is different than the second set of repetition and beam sweeping patterns.

23. The method of claim 22, wherein the first set of repetition and beam sweeping patterns has at least one of a different number of repetitions or a different sequence of one or more beams than the second set of repetition and beam sweeping patterns.

24. The method of claim 20, wherein each of the first and second logical channels includes at least one of a type of communication service, a quality of service flow identifier, a network slice, or a data radio bearer.

25. The method of claim 24, wherein the type of communication service includes an ultra-reliable low latency communication (URLLC) service or an enhanced mobile broadband (eMBB) service.

26. The method of claim 20, wherein transmitting the signaling comprises transmitting the signaling via at least one of downlink control information (DCI) or radio resource control (RRC) signaling.

* * * * *